(12) United States Patent
Hyun et al.

(10) Patent No.: US 10,256,658 B2
(45) Date of Patent: Apr. 9, 2019

(54) OPERATING METHOD OF AN ELECTRONIC DEVICE AND ELECTRONIC DEVICE SUPPORTING THE SAME

(71) Applicant: Samsung Electronics Co., Ltd., Suwon-si, Gyeonggi-do (KR)

(72) Inventors: Hyang Soo Hyun, Busan (KR); Joo Han Kim, Gumi-si (KR); Jin Man Kim, Gumi-si (KR); Joo Hoon Lee, Yongin-si (KR); Chan Hun Yun, Busan (KR); Kyu Jin Kwak, Daegu (KR); Min Soo Kim, Gumi-si (KR); Chul Hyung Yang, Gumi-si (KR); Ji Woo Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 15/187,083

(22) Filed: Jun. 20, 2016

(65) Prior Publication Data

US 2017/0025887 A1    Jan. 26, 2017

(30) Foreign Application Priority Data

Jul. 23, 2015    (KR) .......................... 10-2015-0104235

(51) Int. Cl.
| | |
|---|---|
| *H02J 7/00* | (2006.01) |
| *H02J 7/02* | (2016.01) |
| *H02J 50/90* | (2016.01) |
| *H04B 5/00* | (2006.01) |
| *H02J 50/10* | (2016.01) |
| *H02J 50/12* | (2016.01) |

(52) U.S. Cl.
CPC .............. *H02J 7/025* (2013.01); *H02J 50/10* (2016.02); *H02J 50/90* (2016.02); *H04B 5/0037* (2013.01); *H04B 5/0081* (2013.01); *H02J 50/12* (2016.02)

(58) Field of Classification Search
CPC .......... H02J 7/0025; H02J 50/90; H02J 50/10; H02J 50/12; H04B 5/0037; H04B 5/0081
USPC ....................................................... 320/108
See application file for complete search history.

(56) References Cited

U.S. PATENT DOCUMENTS

| | | |
|---|---|---|
| 8,525,370 B2 | 9/2013 | Walley et al. |
| 9,310,932 B2 | 4/2016 | Bae |
| 9,325,187 B2 | 4/2016 | Lee et al. |
| 9,450,445 B2 | 9/2016 | Lee |
| 2008/0111518 A1* | 5/2008 | Toya ............... H02J 7/0044 320/108 |
| 2011/0127845 A1 | 6/2011 | Walley et al. |
| 2013/0147720 A1 | 6/2013 | Yilmaz |
| 2013/0307468 A1* | 11/2013 | Lee .................. H02J 7/0052 320/108 |

(Continued)

FOREIGN PATENT DOCUMENTS

| | | |
|---|---|---|
| KR | 10-2015-0031852 A | 3/2015 |
| WO | 2015/023092 A1 | 2/2015 |

*Primary Examiner* — Nathaniel Pelton
(74) *Attorney, Agent, or Firm* — Jefferson IP Law, LLP

(57) ABSTRACT

A method for operating an electronic device is provided. The method includes monitoring a noise level of a noise signal received via a panel while wireless power is transmitted and/or received at a first power level via at least a conductive pattern, and generating a signal for changing the first power level corresponding to at least a part of an input to at least a part of the panel.

20 Claims, 15 Drawing Sheets

(56) References Cited

U.S. PATENT DOCUMENTS

| | | |
|---|---|---|
| 2014/0044281 A1* | 2/2014 | Ganem .................... H04R 3/00 |
| | | 381/94.6 |
| 2014/0055098 A1 | 2/2014 | Lee |
| 2014/0078101 A1* | 3/2014 | Katsurahira ............ G06F 3/044 |
| | | 345/174 |
| 2014/0111475 A1 | 4/2014 | Bae |
| 2014/0217965 A1 | 8/2014 | Van Wiemeersch et al. |
| 2016/0204642 A1 | 7/2016 | Oh et al. |
| 2016/0257209 A1* | 9/2016 | Lewis .................... B60L 11/182 |
| 2017/0201128 A1* | 7/2017 | Jung ....................... H02J 50/12 |

\* cited by examiner

OPERATING METHOD OF AN ELECTRONIC DEVICE AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Jul. 23, 2015 in the Korean Intellectual Property Office and assigned Serial number 10-2015-0104235, the entire disclosure of which is hereby incorporated by reference.

TECHNICAL FIELD

The present disclosure relates to operation of an electronic device related to an electromagnetic induction panel and wireless charging.

BACKGROUND

An electronic device is provided with power to operate and may include a battery to obtain power therefrom. The battery may be a rechargeable battery. The battery of the electronic device may be charged wirelessly or by wire. For the wireless charging, the electronic device may include a receiver coil for receiving power. Furthermore, a wireless charging device including a transmitter coil for supplying power to the electronic device may be provided.

The wireless charging is performed such that power of a transmitter coil of an electronic wireless charging device is transferred to a receiver coil of an electronic device to charge a battery of the electronic device. However, such a wireless charging method affects an electromagnetic induction-type electronic pen. Accordingly, the electronic pen may be unable to be operated normally during the wireless charging.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for adaptively operating an electronic device in relation to wireless charging, and an electronic device for supporting the same.

In accordance with an aspect of the present disclosure, an electronic device is provided. The electronic device includes a processor and a memory operatively connected to the processor and configured to store at least one command, wherein the processor detects a noise level of each area of an input receiving panel in a wireless charging state and controls an intensity (or an amount or a size) of a wireless charging current according to an input occurrence location on the input receiving panel.

In accordance with another aspect of the present disclosure, a method for operating an electronic device is provided. The method includes detecting a noise level of each area of an input receiving panel in a wireless charging state and controlling an intensity of a wireless charging current according to an input location on the input receiving panel.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
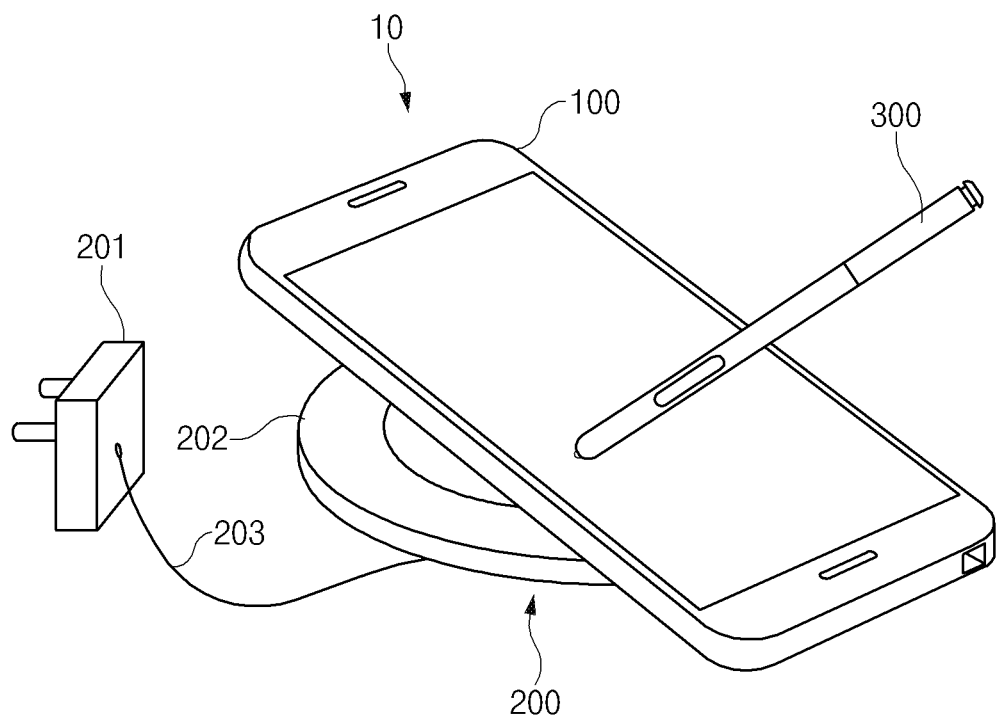
FIG. 1 is a diagram illustrating an example of a wireless charging environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", "may include" or "comprise" used herein indicate the existence of a corresponding feature (e.g., a number, a function, an operation, or an element) and do not exclude the existence of an additional feature.

The terms "A or B", "at least one of A and/or B", or "one or more of A and/or B" may include all possible combinations of items listed together with the term. For example, the terms "A or B", "at least one of A and B", or "at least one of A or B" may indicate all the cases of (1) including at least one A, (2) including at least one B, and (3) including at least one A and at least one B. The terms "first", "second" or the like used herein may modify various elements regardless of the order and/or priority thereof, and are used only for distinguishing one element from another element, without limiting the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a central processing unit (CPU) or an application processor) for executing at least one software program stored in a memory device to perform a corresponding operation.

The terminology used herein is not for delimiting the present disclosure but for describing specific embodiments. Terms defined in general dictionaries, among the terms used herein, may be interpreted as having meanings that are the same as or similar to contextual meanings defined in the related art, and should not be interpreted in an idealized or overly formal sense unless otherwise defined explicitly. Corresponding to cases, even the terms defined herein should not be such interpreted as to exclude embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) audio layer 3 (MP3) player, a mobile medical device, a camera, or a wearable device. According to various embodiments of the present disclosure, the wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In various embodiments of the present disclosure, an electronic device may be a home appliance. The home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller's machine (ATM), a point of sales (POS) of a store, or an Internet of things device (e.g., a bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). In various embodiments of the present disclosure, an electronic device may be one or more combinations of the above-mentioned devices. An electronic device according to various embodiments of the present disclosure may be a flexible device. An electronic device according to an embodiment of the present disclosure is not limited to the above-mentioned devices, and may include new electronic devices with the development of technology.

FIG. 1 is a diagram illustrating an example of a wireless charging environment according to an embodiment of the present disclosure.

Referring to FIG. 1, a wireless charging system environment 10 according to various embodiments of the present disclosure may include an electronic device 100, a wireless charging device 200, and an electronic pen 300.

The wireless charging device 200 may include an adaptor 201 connected to a power supply device, a cable 203 connected to the adaptor 201, and a wireless charging pad 202. The wireless charging device 200 may include a case, a transmission power circuit, and a transmitter coil.

If the adaptor 201 of the wireless charging device 200 is connected to the power supply device (e.g., a permanent power supply disposed in a wall, or the like) in the wireless charging system environment 10, power from the adaptor 201 may be supplied to the transmission power circuit of the wireless charging device 200 via the cable 203. The transmission power circuit of the wireless charging device 200 may allow the supplied power to be transmitted at a specific frequency via at least one transmitter coil. The transmitter coil of the wireless charging device 200 may be fixed to a specified portion of the wireless charging pad 202. According to an embodiment of the present disclosure, the wireless charging pad 202 may be shaped like a circle (or a polygon or a shape corresponding thereto). The transmitter coil may be disposed at a certain location with respect to a central portion of the wireless charging pad 202. The transmitter coil may be wound circularly, forming a certain plane. For example, the transmitter coil may be wound annularly, forming a certain plane. According to various embodiments of the present disclosure, the transmitter coil may have at least one pattern or may have a multi-coil form. The wireless charging pad 202 may have such an area as to cover at least a part of the electronic device 100. For example, the area of the wireless charging pad 202 may be larger than that of a receiver coil disposed in the electronic device 100.

The electronic pen 300 may be inserted into or ejected from a certain portion of the electronic device 100, for example, a side portion of the electronic device 100. Alternatively, the electronic pen 300 may be provided separately from the electronic device 100. The electronic device 300 may include, for example, a pen case or an induction coil. The induction coil may be used to detect a location of the electronic pen in association with an electromagnetic induction panel of the electronic device 100.

The electronic device 100 may have a wireless charging function. In relation to this function, the electronic device 100 may include a receiver coil (e.g., a wireless power antenna or a wireless power transmitting/receiving antenna) corresponding to the transmitter coil of the wireless charging device 200. The receiver coil may be disposed at a rear of the electronic device 100 (e.g., an opposite side to a display). The electronic device 100 may collect, via the receiver coil, wireless power supplied from the transmitter coil. The electronic device 100 may charge a battery or perform an operation using the collected wireless power.

The electronic device 100 according to an embodiment may support an electronic pen function. To this end, the electronic device 100 may include a panel or an input receiving panel (e.g., an electromagnetic induction panel or a pen sheet, hereinafter referred to as a pen sheet) for detecting a signal induced by the electronic pen 300. While wireless charging is performed, the electronic device 100 may measure a level of noise generated in a pen sheet due to the wireless charging, using the pen sheet. The electronic device 100 may check a noise level at a location where a pen input occurs. If the noise level at the location where the pen input occurs is higher than specified reference information, the electronic device 100 may perform charging power control related to the wireless charging. According to an embodiment of the present disclosure, the electronic device 100 may adjust a charging current so that the charging current is decreased to a specified value. If the noise level at the location where the pen input occurs is lower (or less) than the specified reference information, the electronic device 100 may adjust the charging current related to wireless charging.

As described above, in relation to a process adapted to noise of the electronic pen 300, the electronic device 100 may adjust an intensity (or an amount, or size) of the charging current according to a pen input location. In relation to this operation, the electronic device 100 may perform at least one of requesting adjustment of transmission power from the wireless charging device 200, requesting adjustment of the area of the transmitter coil, adjusting the area of the receiver coil, adjusting a wireless charging frequency, or changing a duty cycle. Although operation of the electronic pen 300 and the pen sheet that is an electromagnetic induction panel has been described exemplarily, various embodiments of the present disclosure are not limited thereto. For example, in various embodiments of the present disclosure, the electronic pen 300 may be replaced with another user input means such as a finger, a specific object, or the like. The pen sheet may be an example of an input receiving panel affected by a noise magnetic field during wireless charging.

Figure 2:
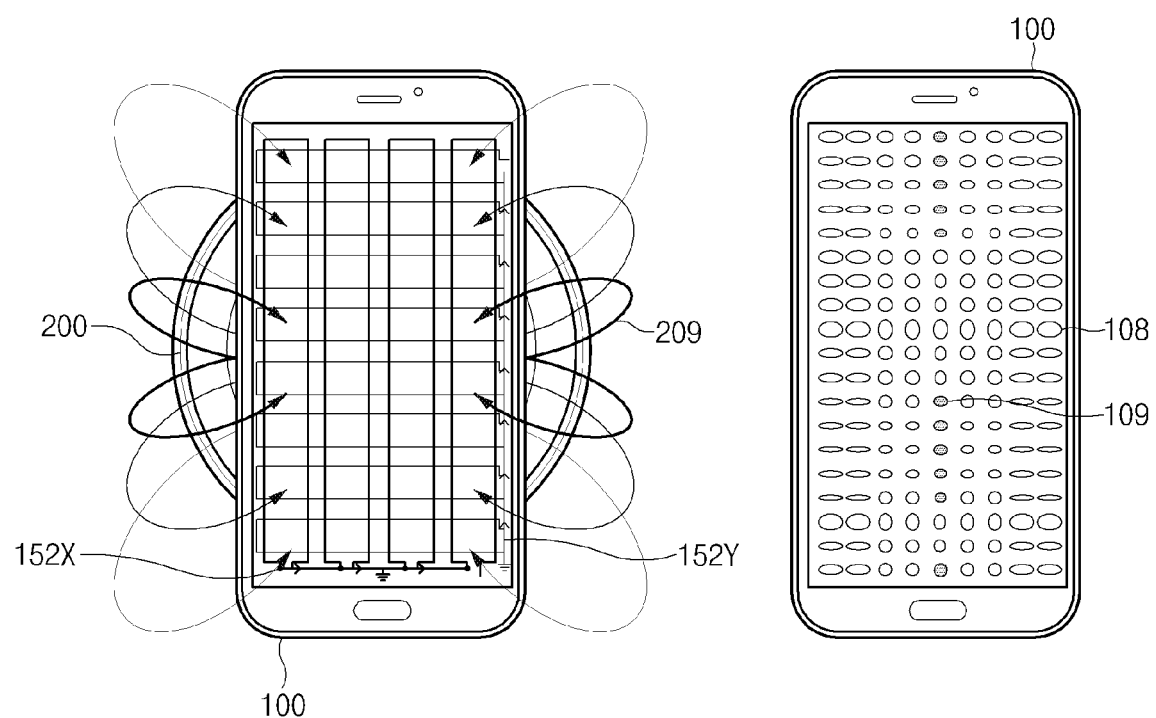
FIG. 2 is a diagram illustrating occurrence of noise in a wireless charging environment according to an embodiment of the present disclosure.

FIG. 2 is a diagram illustrating occurrence of noise in a wireless charging environment according to an embodiment of the present disclosure.

Referring to FIG. 2, the electronic device 100 according to various embodiments of the present disclosure may be placed on the wireless charging device 200 for wireless charging. The wireless charging device 200 may wirelessly transmit power to the electronic device 100 using supplied power. In this operation, the wireless charging device 200 may wirelessly transmit power using a specified frequency band. The electronic device 100 may be provided with an electromagnetic resonance (EMR) sensing sheet (or a pen sheet) in order to detect the electronic pen 300 at one side of a display as the wireless charging device 200 transmits the power. The pen sheet may be a multi-layer flexible printed circuit board (FPCB). According to an embodiment of the present disclosure, the pen sheet may include a first layer in which a plurality of X-loop antennas 152X are arranged and a second layer in which a plurality of Y-loop antennas 152Y are arranged.

The pen sheet, which has a form of a coil for detecting a magnetic field, may detect a fringing magnetic field (or a noise magnetic field) 209 that diffracts on the wireless charging device 200. The noise magnetic field may be detected non-uniformly at the display of the electronic device 100. For example, the noise magnetic field may be detected strongly at a partial area of the display (e.g., a left edge or a right edge) and may be detected relatively weakly or may not be detected at another area (e.g., a center of the display).

Therefore, corresponding to relative positions of the wireless charging device 200 and the electronic device 100 during wireless charging, an intensity of a noise magnetic field generated in the electronic device 100 may vary (e.g., an area 108 in which the intensity of the noise magnetic field is relative high and an area 109 in which the intensity of the noise magnetic field is relatively low). A difference in the noise magnetic field may correspond to, for example, sizes of the areas 108 and 109 as illustrated in FIG. 2.

Figure 3:
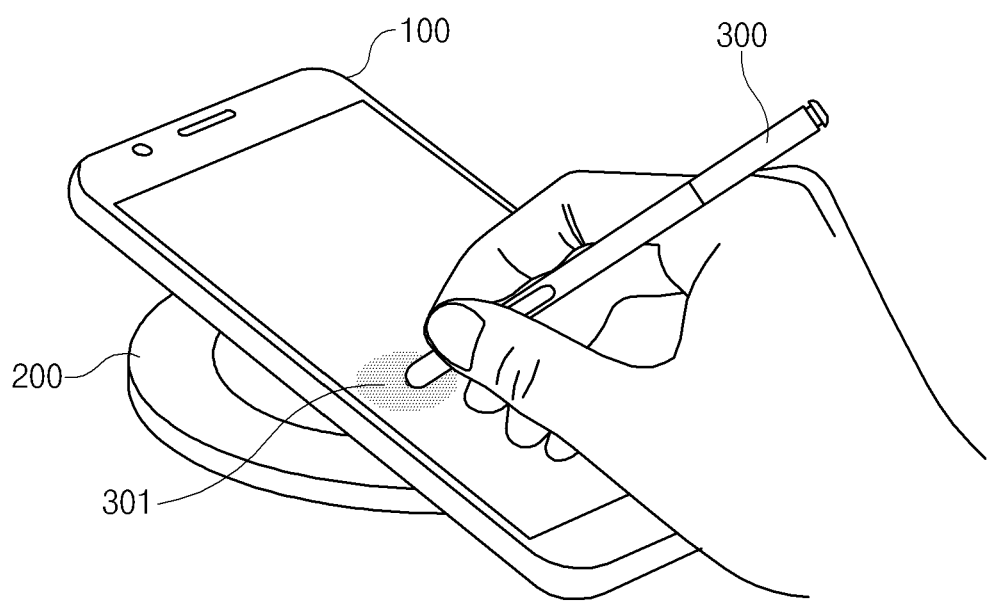
FIG. 3 is a diagram illustrating an electronic device operation environment in a wireless charging environment according to an embodiment of the present disclosure.

FIG. 3 is a diagram illustrating an electronic device operation environment in a wireless charging environment according to an embodiment of the present disclosure.

Referring to FIG. 3, the electronic pen 300 may be operated while the electronic device 100 according to various embodiments of the present disclosure is placed on the wireless charging device 200. For example, a user may perform a write operation on a front surface of the display of the electronic device while holding the electronic pen 300. In this case, for wireless charging, power of the wireless charging device 200 may be wirelessly transmitted to the electronic device 100 at a specific frequency band.

According to various embodiments of the present disclosure, the electronic device 100 may be in a state of being affected by a noise magnetic field due to wireless power transmission of the wireless charging device 200. For example, as described above with reference to FIG. 2, the intensity of the noise magnetic field may increase in a direction from the center of the display to an edge thereof. Therefore, if the electronic pen 300 is disposed on a certain portion 301 of the electronic device 100 (e.g., a portion in which the intensity of the noise magnetic field is higher than a certain level, such as an edge portion of the display) as illustrated in FIG. 3, the electronic device 100 may adjust charging power (e.g., a charging current). For example, if the electronic pen 300 is disposed on the edge portion 301 of the display, the electronic device 100 may request the wireless charging device 200 to reduce (or lower) the charging current. Alternatively, the electronic device 100 may adjust the area of the wireless power transmitting/receiving antenna in order to reduce (or lower) the charging current. According to various embodiments of the present disclosure, if the electronic pen 300 is disposed on the center of the display, the electronic device 100 may request the wireless charging device 200 to increase the charging current or set the charging current at a specific value. For example, the electronic device 100 may request the wireless charging device 200 to transmit the charging current having a specified intensity. Alternatively, the area of the wireless power transmitting/receiving antenna of the wireless charging device 200 or the electronic device 100 may be adjusted so that the charging current having a certain intensity is received.

Figure 4:
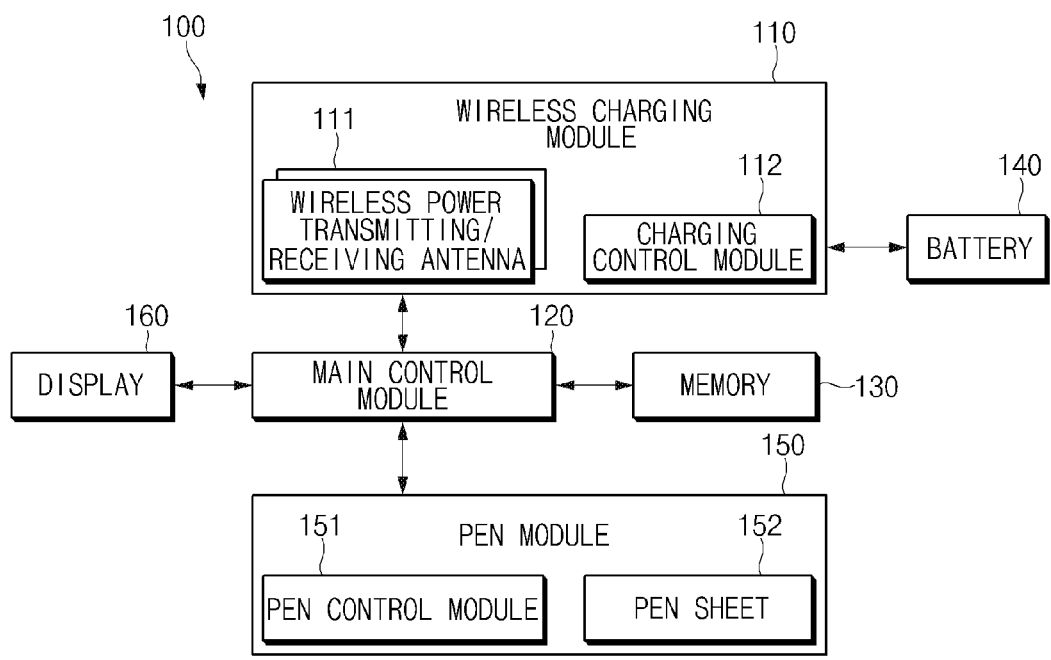
FIG. 4 is a block diagram illustrating an electronic device that supports a wireless charging function according to an embodiment of the present disclosure.

FIG. 4 is a block diagram illustrating an electronic device that supports a wireless power transmitting/receiving function according to an embodiment of the present disclosure.

Referring to FIG. 4, the electronic device 100 according to an embodiment of the present disclosure may include a housing, a wireless charging module 110 (or a wireless power circuit), a main control module 120, a memory 130, a battery 140, a pen module 150, and a display 160 (or a display device).

When a wireless charging state is recognized, the electronic device 100 may detect a noise magnetic field leaking from the wireless charging device 200, and may determine a noise intensity (or amount, or size) of the noise magnetic field for each area of the display 160. The electronic device 100 may be operated in a noise preparation function or noise mode in order to recognize that the noise magnetic field is not an input from the electronic pen 300 but is a noise signal.

In relation to the noise preparation function, the electronic device 100 may increase a threshold value or a sampling count (the number of times of scanning for detecting a signal of the pen sheet within a specified time) in order to decrease an overall sensitivity of magnetic field detection. Alternatively, the electronic device 100 may change an average filter function. According to an embodiment of the present disclosure, if the sampling count of 6 is applied in a state of not performing the noise preparation function (e.g., a noise non-preparation function state), the electronic device 100 may perform sampling 12 times to improve an accuracy of sampling. According to an embodiment of the present disclosure, the electronic device 100 may implement a filter function to delete data that significantly deviates from an average value from collected data. In relation to the noise preparation function, the electronic device 100 may uniformly apply the threshold value or the sampling count to an entire part of the display. Alternatively, the electronic device 100 may divide an area of the display 160 into multiple areas, and may differently apply the threshold value or the sampling count according to noise levels (or degrees) measured differently for each area.

The wireless charging module 110 may support a wireless charging function of the electronic device 100. The wireless charging module 110 may include at least one conductive pattern, for example, a wireless power antenna or a wireless power transmitting/receiving antenna 111 (e.g., the receiver coil), and a charging control module 112. The wireless charging module 110 receives power through magnetic induction or magnetic resonance, and supplies the power to the battery 140. At least a part of the charging control module 112 may be implemented with a processor, or at least one processor may be the charging control module 112. According to an embodiment of the present disclosure, the charging control module 112 may be included in the main control module 120.

The wireless power transmitting/receiving antenna 111 may have a form of a coil, and may serve to receive power from the transmitter coil of the wireless charging device 200 and transfer the power to the charging control module 112. For example, the coil that forms the wireless power transmitting/receiving antenna 111 may have a certain number of turns. The wireless power transmitting/receiving antenna 111 may be used as a power receiving antenna or an antenna for transmitting power stored in the battery 140. Furthermore, the wireless power transmitting/receiving antenna 111 may serve to transmit/receive specified power. According to an embodiment of the present disclosure, the wireless power transmitting/receiving antenna 111 may serve to wirelessly transmit/receive power, and wirelessly transmit/receive specified signals to/from the wireless charging device 200. According to an embodiment of the present disclosure, the wireless power transmitting/receiving antenna 111 may include a plurality of sub-antennas. The sub-antennas may be connected to each other via a switch or a connector. Each of the sub-antennas may be used as an antenna for transmitting/receiving power or an antenna for transmitting/receiving signals of a specific communication module.

The charging control module 112 of the electronic device 100 may transfer, to the battery 140, power received from the wireless power transmitting/receiving antenna 111. Furthermore, the charging control module 112 may transmit, to the main control module 120, information on a preset current amount based on a charging amount of the battery 140. According to various embodiments of the present disclosure, the charging control module 112 may transmit a message (or a specified signal) for requesting adjustment of a charging current to the wireless charging device 200 corresponding to control by the main control module 120. For example, the charging control module 112 may transmit a message (or a signal) for requesting an increase or a reduction of transmission power to the wireless charging device 200 corresponding to control by the main control module 120. Alternatively, the charging control module 112 may transmit a message for requesting adjustment of a power transmission frequency or a message for requesting adjustment of the area of the transmitter coil to the wireless charging device 200 corresponding to control by the main control module 120. According to various embodiments of the present disclosure, an electronic device may perform at least one of an in-band method or an out-of-band method in order to transmit a message (or a command) in relation to wireless power transmission. According to the in-band method, the electronic device may load a command on wireless power itself to send the command According to the out-of-band method, the electronic device may send a command to a wireless charging device via an additional communication module (e.g., a BT module, a Wi-Fi module, a near field communication (NFC) module, or the like).

The memory 130 may store various information related to operation of the electronic device 100, such as a program or data related to operation of the electronic device 100. For example, the memory 130 may store a kernel, middleware, an application programming interface (API), and an application program. According to an embodiment of the present disclosure, the memory 130 may store a pen operation program related to operation of the electronic pen 300. The pen operation program may include, for example, a command for checking whether wireless power transmission/reception is performed, a command for checking whether the operation pen 300 is operated when wireless charging is performed, a command for collecting an input location of the electronic pen 300, or a command for requesting adjustment of a charging current specified for each input location. Furthermore, the pen operation program may include a command related to pen operation for the case where wireless charging is not performed.

The battery 140 may supply power for operating the electronic device 100 corresponding to control by the main control module 120. The battery 140 may be connected to the wireless charging module 110 so that the battery 140 may be charged wirelessly. The battery 140 may have a specified state value according to a battery charging state.

The pen module 150 may handle a function related to operation of the electronic pen 300. To this end, the pen module 150 may include a pen control module 151 and a pen sheet 152. At least a part of the pen control module 151 may be implemented with a processor, or at least one processor may be the pen control module 151.

As described above, the pen sheet 152 may provide an environment in which electromagnetism may be induced using a plurality of signal lines arranged to intersect with each other at different layers. Electromagnetism is induced at a certain portion of the pen sheet 152 as the electronic pen 300 approaches it, so that a location approached by the electronic pen 300 may be determined. According to various embodiments of the present disclosure, a noise magnetic field may be induced at the pen sheet 152 due to wireless power transmission/reception between the transmitter coil of the wireless charging device 200 and the wireless power transmitting/receiving antenna 111.

The pen control module 151 may control power supply to the pen sheet 152. According to an embodiment of the present disclosure, the pen control module 151 may detect a signal for determining a form of a noise magnetic field during wireless charging corresponding to control by the main control module 120, and may provide detected information to the main control module 120. For example, the pen control module 151 may perform the noise preparation function during wireless charging. Alternatively, the pen control module 151 may perform the noise preparation function if a specified event (e.g., an event of ejecting the electronic pen 300 from a mounting device or a user input event related to operation of the electronic pen 300) occurs during wireless charging, corresponding to control by the main control module 120. When performing the noise preparation function, the pen control module 151 may determine a distribution state of the noise magnetic field. Furthermore, the pen control module 151 may receive an input from the electronic pen 300, and may transfer the input to the main control module 120.

The display 160 may perform screen output of the electronic device 100. The display 160 may include the pen sheet 152. Alternatively, the pen sheet 152 may be separately disposed under the display 160. According to various embodiments of the present disclosure, the display 160 may output information on whether wireless charging is performed. Furthermore, the display 160 may output information on whether the electronic pen 300 is operated. According to an embodiment of the present disclosure, the display 160 may output a screen corresponding to a noise magnetic field distribution state. Furthermore, the display 160 may output information for providing a guide on adjustment of a charging current according to the noise magnetic field distribution state.

The main control module 120 (or a processor) may perform various signal control and transfer operations required for operating the electronic device 100. The main control module 120 may include at least one processor, or at least a part of the main control module 120 may be a processor. According to various embodiments of the present disclosure, at least a part of the main control module 120 may include the charging control module 112. According to an embodiment of the present disclosure, if an event of charging occurs as the electronic device 100 is adjacent to the wireless charging device 200 within a certain distance thereto, the main control module 120 may output an alarm about a wireless charging state. The main control module 120 (or a charging control module) may be disposed within a housing, and may be electrically connected to the display device, the panel, and the wireless power circuit. The main control module 120 may output guide information according to the accuracy of an alignment between the electronic device 100 and the wireless charging device 200. According to an embodiment of the present disclosure, if the wireless charging device 200 is not aligned with the electronic device 100 to at least a certain reference degree, the main control module 120 may request the wireless charging device 200 to cut off power transmission. In this operation, the main control module 120 may perform output of information for requesting realignment between the electronic device 100 and the wireless charging device 200.

According to various embodiments of the present disclosure, in a wireless charging state, the main control module 120 may perform the noise preparation function related to operation of the electronic pen 300. For example, if an event related to wireless charging occurs, the main control module 120 may request the pen control module 151 to collect noise magnetic field distribution information. If location information of the electronic pen 300 is collected, the main control module 120 may adjust the charging current according to the location of the electronic pen 300. For example, if the location information of the electronic pen 300 indicates a location where a noise magnetic field level is higher than a specified noise magnetic field level (or noise level), the main control module 120 may decrease the charging current to a specified value or lower. In relation to this operation, the main control module 120 may request the wireless charging device 200 to reduce (or lower) transmission power. Alternatively, the main control module 120 may request adjustment of the area of the transmitter coil of the wireless charging device 200. Alternatively, the main control module 120 may adjust the area of the wireless power transmitting/receiving antenna 111. According to various embodiments of the present disclosure, in relation to the adjustment of the charging current, the main control module 120 may perform at least one of requesting reduction of transmission power, requesting adjustment of the area of the transmitter coil, requesting adjustment of the area of the wireless power transmitting/receiving antenna 111, requesting a change of a transmission power frequency, or requesting a change of a transmission power duty cycle.

According to various embodiments of the present disclosure, if an event related to termination of operation of the electronic pen 300 occurs, the main control module 120 may adjust the charging current to a specified value or higher. Furthermore, when wireless charging is ended, the main control module 120 may inactivate the noise preparation function in relation to operation of the electronic pen 300.

Figure 5:
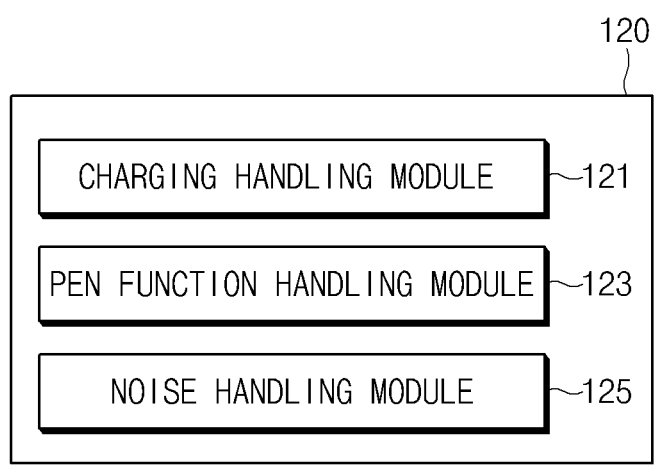
FIG. 5 is a diagram illustrating an example of a main control module according to an embodiment of the present disclosure.

FIG. 5 is a diagram illustrating an example of a main control module according to an embodiment of the present disclosure.

Referring to FIG. 5, the main control module 120 of the electronic device 100 according to various embodiments of the present disclosure may include a charging handling module 121, a pen function handling module 123, and a noise handling module 125. According to various embodiments of the present disclosure, at least one of the charging handling module 121 or the noise handling module 125 of the main control module 120 may be included in the charging control module 112. In the case where the charging control module 112 is provided separately from the main control module 120 (e.g., the case where the charging control module 112 is disposed in a wireless charging module), the charging handling module 121 or the noise handling module 125 may transfer a charging current value, a noise magnetic field detection value, etc. to the main control module 120.

The charging handling module 121 may perform a function related to charging of the battery 140. For example, the charging handling module 121 may detect the accuracy of alignment as the wireless charging device 200 approaches. According to an embodiment of the present disclosure, the charging handling module 121 may determine the intensity of the charging current collected via the wireless power transmitting/receiving antenna 111, and may request an increase or a reduction of transmission power of the wireless charging device 200. If a specified charging initiation event occurs as the wireless charging device 200 approaches, the charging handling module 121 may transfer the charging initiation event to the noise handling module 125. If a specified charging termination event occurs due to separation from the wireless charging device 200 or completion of charging, the charging handling module 121 may transfer the charging termination event to the noise handling module 125.

The pen function handling module 123 may perform event handling related to operation of the electronic pen 300. According to an embodiment of the present disclosure, if the electronic pen 300 leaves a holding part for holding the electronic pen 300, the pen function handling module 123 may determine that an event related to operation of the electronic pen 300 occurs. The pen function handling module 123 may transfer, to the noise handling module 125, the event related to operation of the electronic pen 300. The pen function handling module 123 may detect electromagnetism induced in the pen sheet 152 to collect current location information of the electronic pen 300. The pen function handling module 123 may draw a line or handle a function of selecting a specified icon or virtual button, according to the collected location information.

The noise handling module 125 may handle a function related to operation of the electronic pen 300 during wireless charging. According to an embodiment of the present disclosure, the noise handling module 125 may perform signal processing related to adjustment of the charging current. For example, if a wireless charging initiation event occurs, the noise handling module 125 may request the pen control module 151 to perform noise magnetic field scanning. The noise handling module 125 may determine whether an error of the electronic pen 300 occurs on the basis of a collected noise magnetic field scanning value. For example, the noise handling module 125 may determine an area in which a noise magnetic field of at least a certain intensity occurs as an error occurrence area of the electronic pen 300. Upon receiving the location information of the electronic pen 300 from the pen function handling module 123, the noise handling module 125 may determine whether a corresponding location is the error occurrence area. If the electronic pen 300 is positioned in the error occurrence area, the noise handling module 125 may perform adjustment of the charging current. For example, the noise handling module 125 may perform at least one of requesting reduction of transmission power, requesting adjustment of the area of the transmitter coil, requesting adjustment of the area of the wireless power transmitting/receiving antenna 111, or requesting a change of the transmission power frequency.

If the location of the electronic pen 300 is not positioned in the error occurrence area, the noise handling module 125 may maintain a previous charging state. If the electronic pen 300 is moved from the error occurrence area (or an area in which the noise level is lower (or less) than a specified value) to an error non-occurrence area (or an area in which the noise level is higher than the specified value), the noise handling module 125 may change a charging current state. For example, the noise handling module 125 may allow the battery 140 to be charged by the charging current of which the intensity is higher than a specified value. The noise handling module 125 may perform noise magnetic field detection at a certain period.

According to various embodiments of the present disclosure, the noise handling module 125 may perform noise magnetic field detection according to whether the electronic device 100 is moved. For example, if the electronic device 100 is not moved after the charging initiation event occurs as the electronic device 100 is aligned with the wireless charging device 200, the noise handling module 125 may apply a previously detected noise level to perform the adjustment of the charging current according to an input location of the electronic pen 300. If the electronic device 100 is moved after the electronic device 100 is aligned with the wireless charging device 200, the noise handling module 125 may newly perform the noise magnetic field detection and may perform the adjustment of the charging current according to the input location of the electronic pen 300 on the basis of a result of the detection. Alternatively, if the charging current from the wireless charging device 200 is constant, the noise handling module 125 may use a previously detected noise level, or, if the charging current is changed, the noise handling module 125 may newly perform the noise magnetic field detection.

According to various embodiments of the present disclosure, the main control module 120 (or the charging control module 112) may control current related to operation of an electronic pen even while a wireless power transmitting operation is performed. For example, while performing wireless power transmission, the main control module 120 (or the charging control module 112) may check whether an input event related to operation of an electronic pen occurs on a specified area of the display 160 (e.g., an area in which a noise magnetic field intensity (or amount, or size) is higher than a specified value). If the input event occurs, the main control module 120 (or the charging control module 112) may reduce (or lower) a current amount for transmitting wireless power to a certain level or lower (e.g., a value that does not cause an error in relation to operation of an electronic pen). If the input invent occurs on an area in which a detected noise magnetic field intensity is lower (or less) than the specified value, the main control module 120 (or the charging control module 112) may maintain a previous wireless power transmission state.

According to various embodiments of the present disclosure, an electronic device may include a processor and a memory operatively connected to the processor and configured to store at least one command, wherein the processor which executes the command may detect a noise level of each area of an input receiving panel in a wireless charging state and may control an intensity of a wireless charging current according to an input occurrence location on the input receiving panel.

According to various embodiments of the present disclosure, an electronic device according to an embodiment of the present disclosure may include a housing, a display device (e.g., the display) disposed in the housing, a panel (e.g., an input receiving panel or a pen sheet) adjacent to or disposed in the display device and configured to detect a change of an external magnetic field, a wireless power circuit (e.g., a wireless charging module) disposed in the housing, a conductive pattern (e.g., a receiver coil or a receiver multi-coil) disposed in the housing and electrically connected to the wireless power circuit, a processor disposed in the housing and electrically connected to the display device, the panel, and the wireless power circuit, and a memory electrically connected to the processor, wherein the memory may store instructions for instructing, when being executed, the processor to monitor a noise level of a noise signal received via the panel while wireless power is transmitted and/or received at a first power level via at least the conductive pattern, and generate a signal for changing the first power level corresponding to at least a part of an input to at least a part of the panel.

According to various embodiments of the present disclosure, the memory may store instructions for instructing, when being executed, the processor to maintain an intensity of a wireless charging current according to the first power level if the noise level is lower (or less) than a specified value.

According to various embodiments of the present disclosure, the memory may store instructions for instructing, when being executed, the processor to reduce the intensity of the wireless charging current according to a second power level different from the first power level if the noise level is higher than the specified value.

According to various embodiments of the present disclosure, the electronic device may further include a plurality of wireless power transmitting/receiving antennas for receiving the wireless power and a switch configured to select at least one of the plurality of wireless power transmitting/receiving antennas, wherein the memory may store instructions for instructing, when being executed, the processor to select at least a portion of the plurality of wireless power transmitting/receiving antennas by controlling the switch to reduce an antenna size for transmitting/receiving the wireless power.

According to various embodiments of the present disclosure, the memory may store instructions for instructing, when being executed, the processor to collect a wireless charging current according to a specified power level corresponding to the noise level.

According to various embodiments of the present disclosure, the memory may store instructions for instructing, when being executed, the processor to transmit a signal for requesting adjustment of the wireless charging current to a wireless charging device.

According to various embodiments of the present disclosure, the memory may store instructions for instructing, when being executed, the processor to transmit, to the wireless charging device, at least one of a signal for requesting reduction of transmission power, a signal for requesting reduction of an area of a transmitter coil, or a signal for requesting a change of a transmission frequency.

According to various embodiments of the present disclosure, the memory may store instructions for instructing, when being executed, the processor to output guide information for providing a guide on changing a charging current if an input occurs on a panel area from which a noise of a specified noise level or higher is measured.

According to various embodiments of the present disclosure, the memory may store instructions for instructing, when being executed, the processor to display the guide information on a location of the input or an adjacent area thereto.

According to various embodiments of the present disclosure, the memory may store instructions for instructing, when being executed, the processor to output an alarm about a state of arrangement (or alignment) of the electronic device and the wireless charging device according to a distribution state of the noise level.

According to various embodiments of the present disclosure, the processor may perform control so that a charging function is performed on the basis of a specified wireless charging current if an input function based on the input receiving panel is ended.

According to various embodiments of the present disclosure, the processor may perform control so that the charging function is performed on the basis of the specified wireless charging current when an electronic pen related to operation of the input receiving panel is inserted into a specified portion (e.g., an electronic pen holder or an electronic pen holding or insertion hole).

According to various embodiments of the present disclosure, an electronic device may include a processor and a memory operatively connected to the processor and configured to store at least one command, wherein the processor which executes the command may detect a noise level of each area of an input receiving panel if wireless charging is started in a state of operating an electronic pen, and may control an intensity of a wireless charging current according to an input occurrence location on the input receiving panel.

According to various embodiments of the present disclosure, the processor may perform control so that wireless charging is performed with a specified charging current if the operating of the electronic pen is ended.

Figure 6:
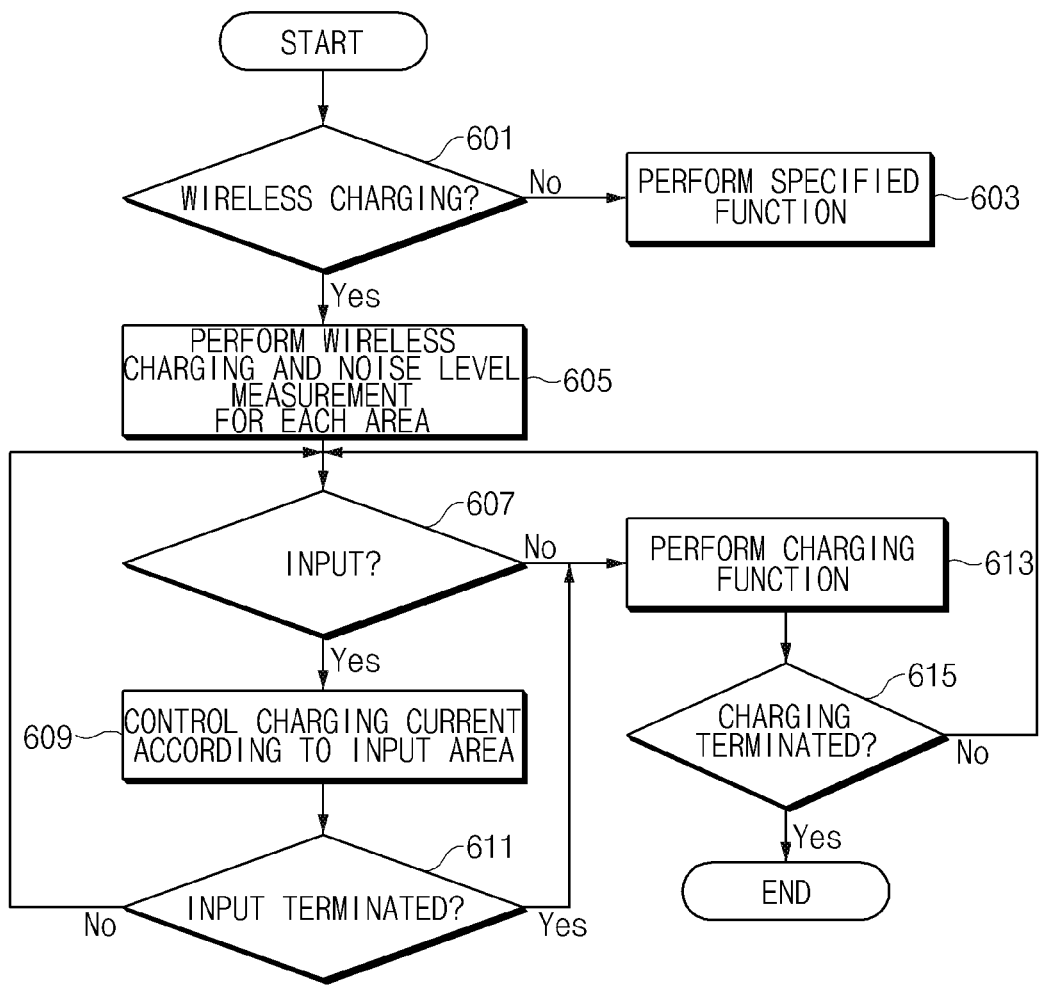
FIG. 6 is a diagram illustrating an electronic device operating method according to an embodiment of the present disclosure.

FIG. 6 is a diagram illustrating an electronic device operating method according to an embodiment of the present disclosure.

Referring to FIG. 6, the electronic device 100 may determine whether to perform wireless charging on the basis of a corresponding event in operation 601. For example, the electronic device 100 may detect that a certain charging current is induced via the wireless power transmitting/receiving antenna 111 of the charging control module 112 to determine whether a wireless charging initiation event occurs. Alternatively, the electronic device 100 may determine that the wireless charging initiation event occurs if a signal periodically transmitted from the wireless charging device 200 is received. Alternatively, the electronic device 100 may determine that the wireless charging initiation event occurs if power is wirelessly transmitted (e.g., in the case of wirelessly transmitting power to charge another electronic device).

If an event that occurs is not related to wireless charging, the electronic device 100 may support performance of a function according to the type of the event in operation 603. For example, if an input from the electronic pen 300 occurs, the electronic device 100 may perform a function of selecting an item or drawing a line corresponding to the input.

If an event related to wireless charging occurs, the electronic device 100 may perform wireless charging and noise level measurement for each area in operation 605. For example, the electronic device 100 may request the pen control module 151 to measure a noise level. The pen control module 151 may measure the noise level of an input receiving panel such as a pen sheet. In this operation, the pen control module 151 may detect a noise level distribution of each area of the input receiving panel. The electronic device 100 may store the noise level provided by the pen control module 151. Furthermore, the electronic device 100 may charge the battery 140 with power provided by the wireless charging device 200.

In operation 607, the electronic device 100 may determine whether an input event (e.g., a pen input, a finger input, or the like) occurs on the input receiving panel. According to an embodiment of the present disclosure, the electronic device 100 may check whether there is a signal induced on the pen sheet 152 as the electronic pen approaches. If a signal having a reference value or higher is detected from a specific portion of the pen sheet 152, the electronic device 100 may determine that an input from a user input means such as the electronic pen 300 occurs.

If the input event occurs, the electronic device 100 may control a charging current according to an input area in operation 609. For example, the electronic device 100 may check the noise level of the input area. If the noise level of the input area is lower than a specified certain value, the electronic device 100 may maintain a previous charging current state. If the noise level of the input area is higher than the certain value, the electronic device 100 may change the previous charging current state. According to an embodiment of the present disclosure, the electronic device 100 may send a request to the wireless charging device 200 or may adjust a coil area of the wireless power transmitting/receiving antenna 111 in order to reduce the charging current.

In operation 611, the electronic device 100 may determine whether an input operation related to the user input means is terminated (e.g., termination of operation of the input receiving panel). For example, the electronic device 100 may determine that the input operation is terminated if an electronic pen input does not occur for a specified time. Alternatively, the electronic device 100 may determine whether the electronic pen 300 is inserted into a specified portion (e.g., an electronic pen placing part that is mechanically provided). If the electronic pen 300 is inserted into the electronic pen placing part that is mechanically provided, the electronic device 100 may determine that the input operation is terminated. Alternatively, if an input event for terminating the electronic pen input occurs, the electronic device 100 may determine that the input operation is terminated. In relation to this operation, the electronic device 100 may provide an electronic pen input function program (e.g., a memorandum program, a pen input program, or the like) and may determine whether the program is terminated.

If the input event does not occur, the electronic device 100 may support a charging function on the basis of a specified charging current in operation 613. Also, if an electronic pen input function is terminated, the electronic device 100 may perform a charging function on the basis of a specified charging current in operation 613. In this operation, the electronic device 100 may restore an intensity-adjusted charging current to a specified value in relation to operation of the electronic pen 300. For example, after the electronic device 100 reduces the charging current according to a pen input location, the electronic device 100 may perform an operation for restoring the reduced charging current if the pen input operation is terminated. In relation to restoration of the charging current, the electronic device 100 may request the wireless charging device 200 to increase transmission power or adjust the area of the transmitter coil. Alternatively, the electronic device 100 may adjust the area of the wireless power transmitting/receiving antenna 111 (or the receiver coil).

In operation 615, the electronic device 100 may determine whether a charging termination event occurs. If the charging termination event occurs, the electronic device 100 may suspend a charging current control function related to operation of the electronic pen 300. If the charging termination event does not occur, the process may return to operation 607 so that the electronic device 100 may re-perform operation 607 and subsequent operations. According to various embodiments of the present disclosure, charging may be completed before the electronic pen input is terminated. For example, the electronic device 100 may periodically check the noise magnetic field since a current amount may be adjusted in a full-charged interval. In the case where the current amount is adjusted as battery charging is completed, the electronic device 100 may detect the noise magnetic field, and may suspend the charging current control function according to an intensity of the detected noise magnetic field.

Figure 7:
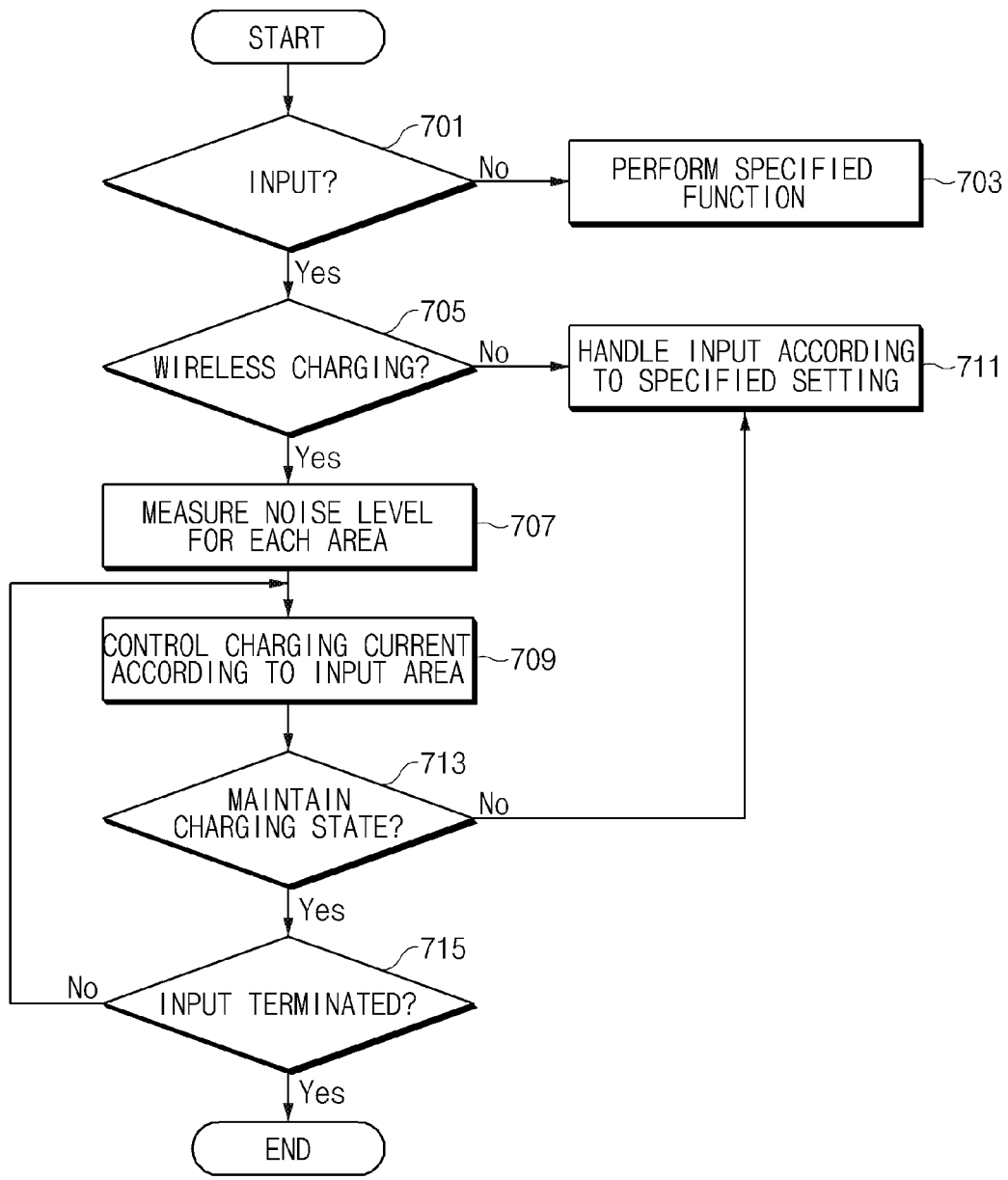
FIG. 7 is a diagram illustrating an example of an electronic device operating method according to an embodiment of the present disclosure.

FIG. 7 is a diagram illustrating an example of an electronic device operating method according to an embodiment of the present disclosure.

Referring to FIG. 7, if a specific event occurs, the electronic device 100 may determine whether the event is related to an input to a touch screen (or an input receiving panel) in operation 701. According to an embodiment of the present disclosure, the electronic device 100 may determine whether an event related to an input from the electronic pen 300 occurs. If the event that occurs is not an input event through the touch screen, the electronic device 100 may perform a specified function according to the type of the event in operation 703. For example, the electronic device 100 may perform a call function, a file editing function, a web surfing function, or the like according to the event type.

If a specified input event occurs, the electronic device 100 may determine whether wireless charging is performed in operation 705. The specified input event may include, for example, an event indicating operation of the electronic pen 300. For example, the specified input event may include an event in which the electronic device 100 detects that the electronic pen 300 is separated from the electronic device 100 after being inserted into the electronic device 100. Alternatively, the specified input event may include the case where a distance between the electronic pen 300 and the pen sheet 152 is less than a certain distance (e.g., a hovering recognition state). Alternatively, the specified input event may include an event of selecting a virtual button or an icon related to operation of an electronic pen. As described above, the specified input event may include an event in which the electronic device 100 recognizes that the electronic pen 300 is to be used. Alternatively, the specified input event may include a specific event related to operation of a specified user input means of the electronic device 100.

If the specified input event occurs or a wireless charging initiation event occurs while the specified user input means (e.g., the electronic pen 300) is operated, the electronic device 100 may measure a noise level of each area of an input receiving panel (e.g., the pen sheet 152) in operation 707. For example, if a specified signal is received from the wireless charging device 200 or if the wireless power transmitting/receiving antenna 111 receives a charging current of a specified intensity or higher as the wireless charging device 200 approaches, the electronic device 100 may determine that the wireless charging initiation event occurs. The electronic device 100 may store the noise level of each area.

In operation 709, the electronic device 100 may control a charging current according to an input area. For example, the electronic device 100 may obtain information on a location where an input occurs, and may determine whether the noise level of the obtained location is higher than a reference value. If the noise level is higher than the reference value at which an error of the input may occur, the electronic device 100 may reduce the charging current. If the noise level is lower than the reference value (i.e., the noise level has a value that does not cause an error), the electronic device 100 may maintain a previous state of the charging current. Alternatively, if the noise level is lower than the reference value that causes the error of the input (i.e., the noise level has a value that does not cause an error), the electronic device 100 may receive a specified charging current. The value that causes the error may vary with physical characteristics of the input receiving panel or physical characteristics of the electronic pen.

In relation to adjustment of the charging current, the electronic device 100 may communicate with the wireless charging device 200 so that a specified charging current is received. Alternatively, the electronic device 100 may adjust the area of the wireless power transmitting/receiving antenna 111 (or select at least one of a plurality of wireless power transmitting/receiving antennas having different physical characteristics) so that the specified charging current is received.

If wireless charging is not performed, the electronic device 100 may perform input handling according to a specified setting in operation 711. For example, the electronic device 100 may perform a function of selecting an item or drawing a line according to an input from the electronic pen 300. In operation 713, the electronic device 100 may determine whether a charging state is maintained. If the charging state is not maintained, for example, if the charging state is terminated, the process may proceed to operation 711 so that the electronic device 100 may support handling of an electronic pen input according to the specified setting.

If the charging state is maintained, the electronic device 100 may determine whether an input operation is terminated in operation 715. If the input from the electronic pen 300 is terminated, the electronic device 100 may terminate the charging current control function for the input from the electronic pen 300 in the wireless charging state. Accordingly, the electronic device 100 may control the charging current so that the charging current has a specified value. If the input from the electronic pen is not terminated, the process may return to operation 709 so that the electronic device 100 may re-perform operation 709 and the following operations.

Although it has been described that the charging current is adjusted according to whether the noise level of a location where the input from the electronic pen 300 occurs is higher than a specified value or lower than the specified value, various embodiments of the present disclosure are not limited thereto. For example, the electronic device 100 may differently adjust the charging current according to the noise level. In relation to this operation, the electronic device 100 may divide the noise level into a plurality of levels. The electronic device 100 may perform control so that the charging current corresponding to the location of the input from the electronic pen 300 is received. According to an embodiment of the present disclosure, the electronic device 100 may divide the noise level into five stages (i.e., divide the noise level so that an interval between a maximum value and a minimum value of the noise level is divided into five stages). If the noise level of the location where the input from the electronic pen 300 occurs belongs to a specific stage (e.g., a third stage), the electronic device 100 may perform control so that the charging current corresponding to the stage is received. In relation to this operation, the electronic device 100 may store information on charging current values for each stage at which noise that affects the input from the electronic pen 300 does not occur. In order to receive the charging current having a specified value, the electronic device 100 may perform at least one of requesting a change of transmission power of the wireless charging device 200, requesting a change of the area of the transmitter coil of the wireless charging device 200, changing a duty cycle or a frequency related to a wireless charging operation, or adjusting the area of the wireless power transmitting/receiving antenna 111.

According to various embodiments of the present disclosure, a method for operating an electronic device according to an embodiment may include detecting a noise level of each area of an input receiving panel in a wireless charging state and controlling an intensity (or an amount, or a size) of a wireless charging current according to an input location on the input receiving panel.

According to various embodiments of the present disclosure, a method for operating an electronic device according to an embodiment of the present disclosure may include monitoring a noise level of a noise signal received via a panel while power is wirelessly transmitted and/or received at a first power level via at least a conductive pattern, and generating a signal for changing the first power level corresponding to at least a part of an input to at least a part of the panel.

According to various embodiments of the present disclosure, the generating may include maintaining a previous intensity of a wireless charging current if the noise level is lower than a specified value.

According to various embodiments of the present disclosure, the generating may include reducing an intensity of the wireless charging current if the noise level is higher than the specified value.

According to various embodiments of the present disclosure, the reducing may include reducing a size (or area) of a wireless power transmitting/receiving antenna.

According to various embodiments of the present disclosure, the generating may include collecting the wireless charging current of a specified intensity according to the noise level.

According to various embodiments of the present disclosure, the generating may include transmitting, to a wireless charging device, a signal for requesting adjustment of the wireless charging current.

According to various embodiments of the present disclosure, the transmitting of the signal to the wireless charging device may include transmitting, to the wireless charging device, at least one of a signal for requesting reduction of transmission power, a signal for requesting reduction of an area of a transmitter coil, or a signal for requesting a change of a transmission frequency.

According to various embodiments of the present disclosure, the method may further include outputting guide information for providing a guide on changing a charging current if an input occurs on a panel area from which a noise of a specified noise level or higher is measured.

According to various embodiments of the present disclosure, the outputting may include displaying the guide information on a location of the input or an adjacent area thereto.

According to various embodiments of the present disclosure, the method may further include outputting an alarm about a state of arrangement (or alignment) of the electronic device and the wireless charging device according to a distribution state of the noise level.

According to various embodiments of the present disclosure, a method for operating an electronic device may include detecting wireless charging while an electronic pen is operated, detecting a noise level of each area of an input receiving panel, and controlling an intensity of a wireless charging current according to an input location on the input receiving panel.

According to various embodiments of the present disclosure, the method may further include performing a wireless charging function on the basis of a specified charging current if operation of the electronic pen is terminated.

Figure 8:
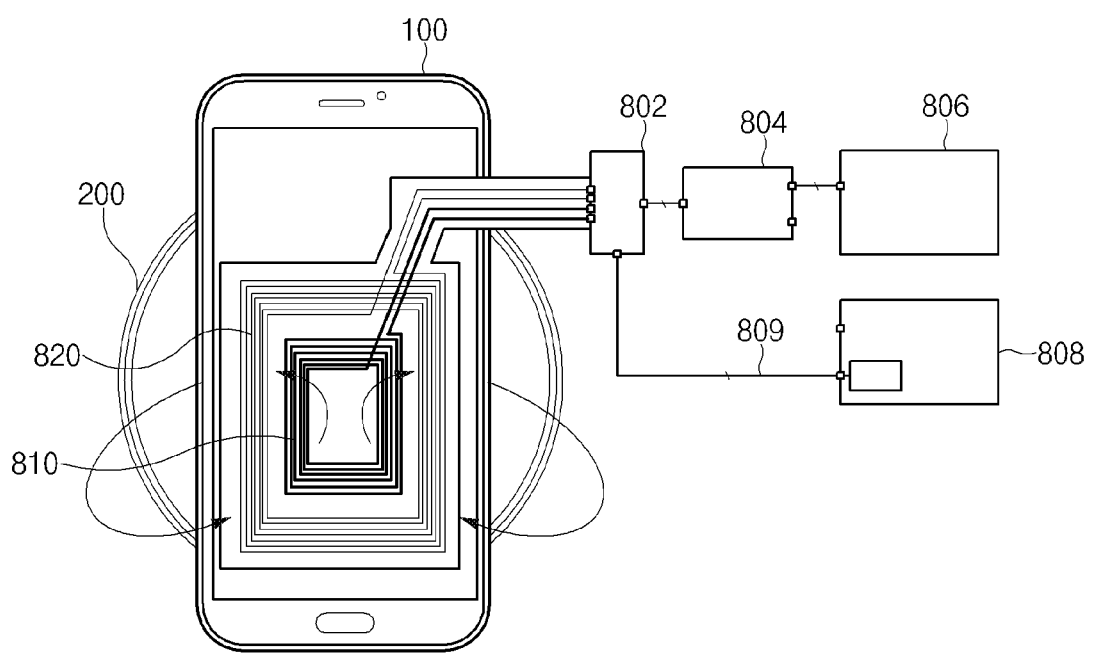
FIG. 8 is a diagram illustrating a partial configuration of an electronic device related to control of a charging current according to an embodiment of the present disclosure.

FIG. 8 is a diagram illustrating an example of a partial configuration of an electronic device related to control of a charging current according to an embodiment of the present disclosure.

Referring to FIG. 8, the electronic device 100 according to various embodiments of the present disclosure may include a wireless power transmitting/receiving antenna 810, an NFC antenna 820, a connector 802, a switch 804, an NFC module 806, a charging control module 808, and a first signal line 809.

The electronic device 100 may collect intensity information (or a noise level) of a noise magnetic field detected in a state in which wireless charging is recognized or a state in which the electronic device 100 enters a noise mode (or function) during wireless charging. The electronic device 100 may adjust charging coverage of a wireless charging coil of the electronic device 100 according to a collected noise level. Since an induced electromotive force is proportional to a coil area, the electronic device 100 may operate a wireless power transmitting/receiving antenna having different coil areas in order to reduce a generated noise magnetic field.

The wireless power transmitting/receiving antenna 810 may be an antenna disposed for transmitting/receiving wireless power. As illustrated in FIG. 8, the wireless power transmitting/receiving antenna 810 may be disposed as a winding on a certain center portion of the electronic device 100 so as to have a certain coil area. The wireless power transmitting/receiving antenna 810 may be connected to the connector 802.

The NFC antenna 820 may be disposed for wireless charging and for operating the NFC module 806. The NFC antenna 820 may have a shape in which concentric circles larger than the transmitting/receiving antenna 810 are overlapped. The NFC antenna 820 may be connected to the switch 804 via the connector 802.

Both ends of the wireless power transmitting/receiving antenna 810 may be connected to the connector 802. Furthermore, both ends of the NFC antenna 820 may be connected to the connector 820. The connector 802 may be connected to the switch 804. The connector 802 may be connected to the charging control module 808. Accordingly, the connector 802 may control, corresponding to control by the charging control module 808, at least one of the wireless power transmitting/receiving antenna 810 or the NFC antenna 820 so that at least one of the wireless power transmitting/receiving antenna 810 or the NFC antenna 820 is operated for receiving wireless power.

The switch 804 may be disposed between the connector 802 and the NFC module 806. The switch 804 may control a connection between the connector 802 and the NFC module 806 corresponding to control by the charging control module 808 or control by the main control module 120. According to an embodiment of the present disclosure, the switch 804 may be turned off in a charging state so that the connector 802 is disconnected from the NFC module 806. In a non-charging state, the switch 804 may be turned on so that the connector 802 is connected to the NFC module 806. According to various embodiments of the present disclosure, if a request for operating the NFC module 806 is made, the switch 804 may be turned on.

The NFC module 806 may support an NFC function of the electronic device 100. The NFC module 806 may be connected to the NFC antenna 820 via the switch 804 and the connector 802.

The charging control module 808 may control the wireless charging function of the electronic device 100. According to an embodiment of the present disclosure, the charging control module 808 may determine that a charging initiation event occurs upon receiving a specified signal transmitted from the wireless charging device 200 via the wireless power transmitting/receiving antenna 810. If the charging initiation event occurs, the charging control module 808 may transfer the event to the main control module 120 and may perform wireless charging. The charging control module 808 may transfer, to the main control module 120, charging current information (e.g., a charging current amount) according to wireless charging conditions.

The first signal line 809 may connect the connector 802 to the charging control module 808. The first signal line 809 may transfer, to the charging control module 808, a charging current received by the wireless power transmitting/receiving antenna 810 via the connector 802.

As described above, the electronic device 100 may change the coil area using a coil (e.g., the NFC antenna 820) for performing a function (e.g., an NFC function) other than a wireless charging function in addition to the wireless power transmitting/receiving antenna 810 used as a wireless charging coil. In this operation, if an intensity of a detected noise magnetic field is lower than a certain level, the electronic device 100 may use the wireless charging coil (e.g., the wireless power transmitting/receiving antenna 810), or, if the intensity of the detected noise magnetic field is higher than the certain level, the electronic device 100 may connect, via the switch 804, another coil (e.g., the NFC antenna 820) having a larger area than that of the wireless charging coil.

The NFC antenna 820 may be replaced with another antenna. For example, the NFC antenna 802 may be replaced with an antenna disposed for operating another short-range communication module such as a Bluetooth antenna embedded in the electronic device 100.

According to various embodiments of the present disclosure, the wireless power transmitting/receiving antenna 810 and the NFC antenna 802 may be provided in a multi-coil form. In this case, the electronic device 100 may control the charging current on the basis of a combination of at least a part of the multi-core-type wireless power transmitting/receiving antenna 810 and at least a part of the multi-core-type NFC antenna 820.

Figure 9:
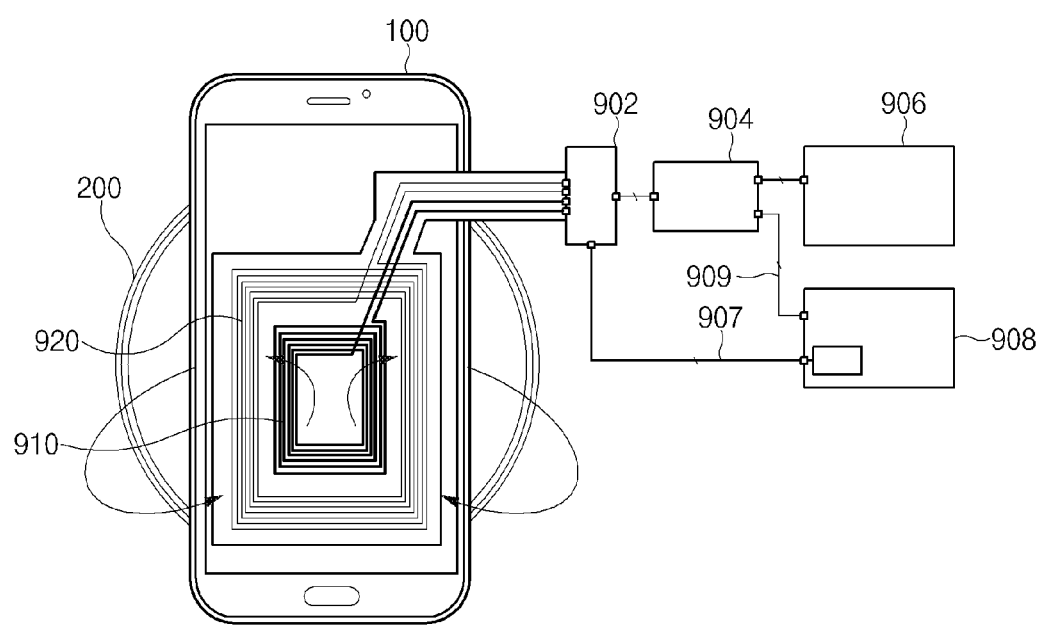
FIG. 9 is a diagram illustrating an example of a partial configuration of an electronic device related to control of a charging current according to an embodiment of the present disclosure.

FIG. 9 is a diagram illustrating an example of a partial configuration of an electronic device related to control of a charging current according to an embodiment of the present disclosure.

Referring to FIG. 9, the electronic device 100 according to various embodiments of the present disclosure may include a wireless power transmitting/receiving antenna 910, an NFC antenna 920, a connector 902, a switch 904, an NFC module 906, a charging control module 908, a first signal line 907, and a second signal line 909. The wireless power transmitting/receiving antenna 910, the NFC antenna 920, the connector 902, the switch 904, the NFC module 906, and the charging control module 908 may support functions that are the same as or similar to those of the corresponding elements of FIG. 8.

The first signal line 907 may connect the charging control module 908 to at least one of the NFC antenna 920 or the wireless power transmitting/receiving antenna 910 connected to the connector 902. The second signal line 909 may connect the switch 904 to the charging control module 908. According to an embodiment of the present disclosure, the second signal line 909 may connect the NFC antenna 920 to the charging control module 908.

The electronic device 100 may collect intensity information (or a noise level) of a noise magnetic field in a state in which wireless charging is recognized or a state in which the electronic device 100 enters a noise mode during wireless charging. The electronic device 100 may adjust the charging coverage of a wireless charging coil (e.g., the wireless power transmitting/receiving antenna 910) to use the noise magnetic field as a source of charging power (power source for charging a battery). The electronic device 100 may increase the coil area in order to use the noise magnetic field (e.g., a fringing magnetic flux) between the wireless charging device 200 and the electronic device 100 as a power source for charging a battery. According to an embodiment of the present disclosure, if the intensity of the noise magnetic field is lower than a certain level, the electronic device 100 may use the wireless power transmitting/receiving antenna 910, or, if the intensity of the noise magnetic field is higher than the certain level, the electronic device 100 may control the switch 904 so as to use the wireless power transmitting/receiving antenna 910 and the NFC antenna 920. As described above, the electronic device 100 may use the noise magnetic field collected via the NFC antenna 920 as another source (or a charging power source) of a battery charging input.

Figure 10:
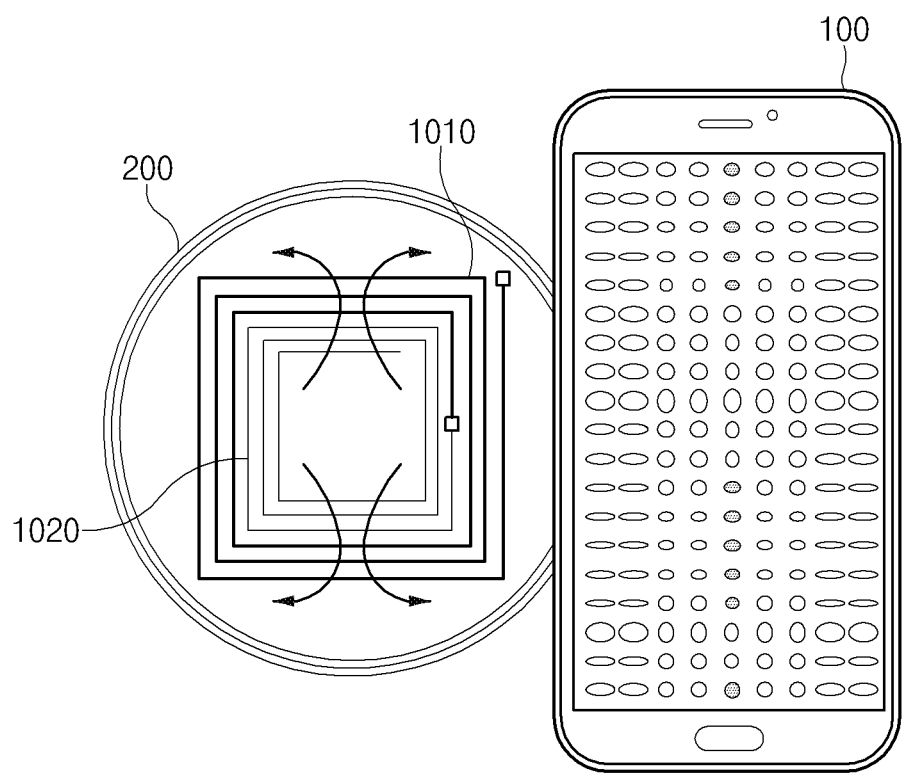
FIG. 10 is a diagram illustrating an example of a wireless charging device related to control of a charging current according to an embodiment of the present disclosure.

FIG. 10 is a diagram illustrating an example of a wireless charging device related to control of a charging current according to an embodiment of the present disclosure.

Referring to FIG. 10, the wireless charging device 200 according to various embodiments of the present disclosure may include a first transmitter coil 1010 and a second transmitter coil 1020. Furthermore, the wireless charging device 200 according to an embodiment of the present disclosure may include a switch for selectively operating at least one of the first transmitter coil 1010 or the second transmitter coil 1020 and a transmission power circuit for controlling the switch and the wireless transmission of power via the transmitter coils 1010 and 1020.

The main control module 120 of the electronic device 100 may detect a noise magnetic field from a loop antenna disposed on a first-type pen sheet (e.g., an EMR sensing sheet) or may detect a noise frequency from a sensor disposed on a second-type pen sheet (e.g., a conductive sensing sheet) while a wireless charging state is recognized. If the noise magnetic field is detected, the main control module 120 may control the wireless charging device 200 so that a frequency for wireless charging power is shifted.

In FIG. 10, the first transmitter coil 1010 may be a default coil designed to exhibit optimal efficiency of wireless charging. The second transmitter coil 1020 may have a smaller area than that of the first transmitter coil 1010 in order to reduce (or lower) the noise level of wireless charging.

The electronic device 100 according to an embodiment of the present disclosure may request the wireless charging device 200 to change a length of a wireless charging coil if the intensity of the detected noise magnetic field is higher than a certain value. Accordingly, the wireless charging device 200 may transmit power via the second transmitter coil 1020, upon receiving a request for adjusting charging power from the electronic device 100 while operating the first transmitter coil 1010.

According to various embodiments of the present disclosure, a wireless charging device according to an embodiment of the present disclosure may include a plurality of transmitter coils and a switch for connecting at least one of the plurality of transmitter coils to a transmission power circuit, wherein, upon receiving a charging power reduction request signal from an electronic device, the transmission power circuit may control the switch so that at least one of the plurality of transmitter coils is operated to thereby reduce (or lower) charging power.

According to various embodiments of the present disclosure, a wireless charging device according to an embodiment of the present disclosure may include at least one transmitter coil and a transmission power circuit connected to the at least one transmitter coil, wherein, upon receiving a charging power reduction request signal from an electronic device, the transmission power circuit may transmit power on the basis of a frequency corresponding to reduced charging power.

Figure 11A:
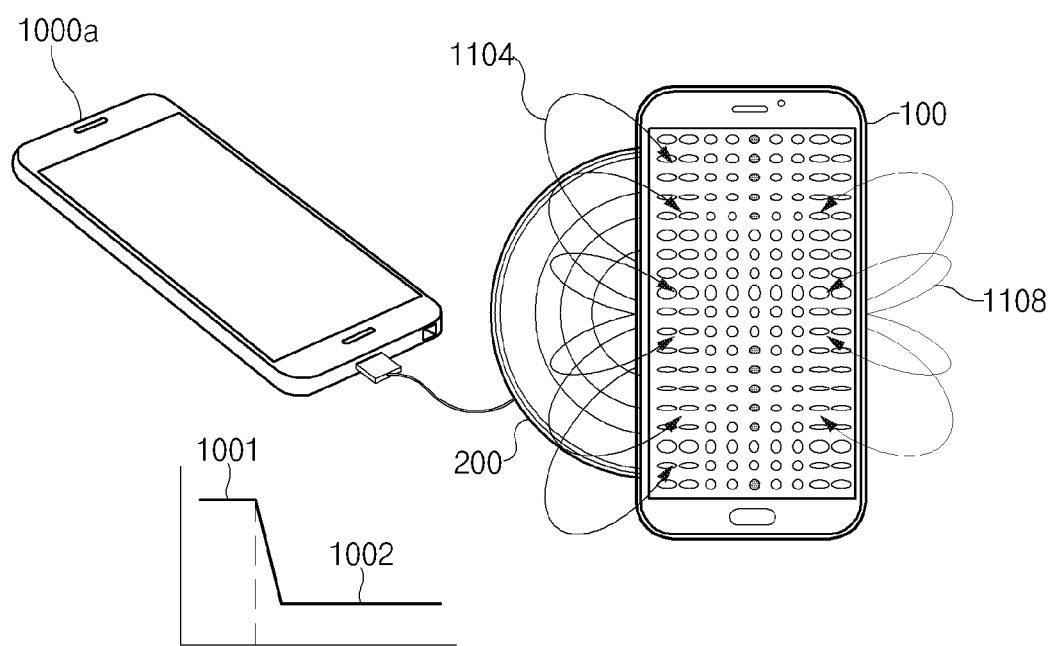
FIG. 11A is a diagram illustrating an example of charging conditions according to an embodiment of the present disclosure.

FIG. 11A is a diagram illustrating an example of charging conditions according to an embodiment of the present disclosure.

Referring to FIG. 11A, in the charging conditions, an external electronic device 1000*a* may transmit power via a cable so that the power is wirelessly transmitted via the wireless charging device 200. The electronic device 100 may be placed on the wireless charging device 200. Accordingly, power stored in a battery of the external electronic device 1000*a* may be transferred to the electronic device 100 via the wireless charging device 200. In this operation, the main control module 102 of the electronic device 100 may collect intensity information of a noise magnetic field 1104 in a state in which wireless charging is recognized or a state in which the electronic device 100 enters a noise mode during wireless charging. The electronic device 100 may detect relative location information with respect to the wireless charging device 200 on the basis of the intensity information of the collected noise magnetic field 1104. For example, as illustrated in FIG. 11A, the noise magnetic field 1104 may be relatively strong at one of a left side or a right side of the electronic device 100 which is closer to the wireless charging coil than the other side, and the noise magnetic field 1108 may be relatively weak at the other side of the electronic device 100.

In the above-mentioned state of the noise magnetic field, if the electronic device 100 is biased rightwards with respect to a longitudinal center line of the wireless charging device 200, a noise level 1001 at a left edge of the electronic device 100 may be higher than a noise level 1002 at a right edge of the electronic device 100. The electronic device 100 may perform analysis on how it is placed on the wireless charging device 200 on the basis of the above-mentioned noise level distribution.

In the above-mentioned conditions, the efficiency of power transferred from the wireless charging device 200 to the electronic device 100 may be low. The electronic device 100 according to an embodiment of the present disclosure may detect location information relative to the wireless charging device 200, and may transfer transmission power control information to the wireless charging device 200. For example, if a charging efficiency is lower (or less) than a specified charging efficiency, the electronic device 100 may request the external electronic device 1000*a* to suspend power transmission. Alternatively, the electronic device 100 may output, through a display or an audio device, information for providing a guide on adjustment of an arrangement state (or an alignment state) with respect to the wireless charging device 200.

According to various embodiments of the present disclosure, if an input from the electronic device 300 occurs, the electronic device 100 may output information for notifying of a state of charging current supply, the efficiency of which is lower than a specified efficiency, between the electronic device 100 and the wireless charging device 200. According to an embodiment of the present disclosure, the electronic device 100 may output, to a portion where the input from the electronic device 300 occurs, a popup window or a warning image (or at least one of a text or an image) including the above-mentioned information (information for requesting realignment with the wireless charging device 200). If movement of the electronic device 100 occurs, the electronic device 100 may detect the state of charging current supply again, and may output guide information or perform a charging operation according to a charging current efficiency. In this operation, the electronic device 100 may determine whether the movement occurs using an acceleration sensor or the like. The electronic device 100 may periodically output a guide sound or guide information unless the movement occurs.

Figure 11B:
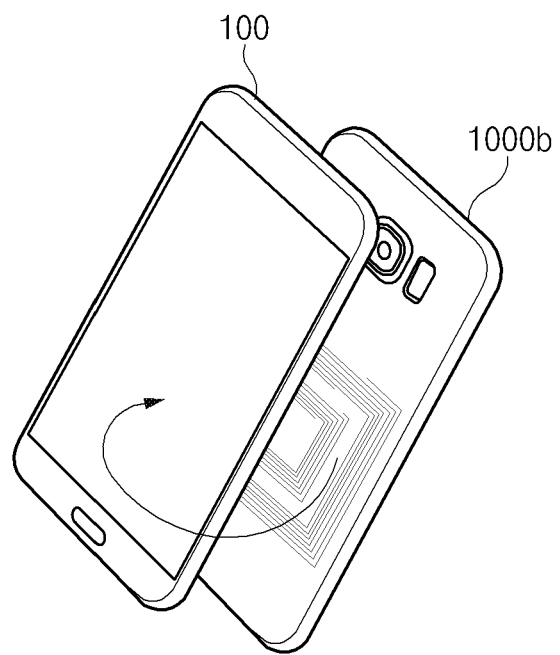
FIG. 11B is a diagram illustrating an example of charging conditions according to an embodiment of the present disclosure.

FIG. 11B is a diagram illustrating an example of charging conditions according to an embodiment of the present disclosure.

Referring to FIG. 11B, the electronic device 100 may be stacked on an external electronic device 1000*b*. According to an embodiment of the present disclosure, the rear of the electronic device 100 may face that of the external electronic device 1000*b*. In this state, the external electronic device 1000*b* may transmit, to the electronic device 100, power stored in a battery via a wireless power transmitting/receiving antenna. Here, the electronic device 100 may detect the efficiency of charging by the power transmitted from the external electronic device 1000*b*. If the efficiency of charging is lower than a specified value, the electronic device 100 may request the external electronic device 1000*b* to suspend power transmission or decrease the power to a specified value or lower. In addition, the electronic device 100 may output a guide sound or guide information for providing a guide on adjustment of arrangement (or alignment) of the electronic device 100 with respect to the external electronic device 1000*b*.

If rearrangement of the electronic device 100 occurs, the electronic device 100 may request the external electronic device 1000*b* to transmit power. As the electronic device 100 is rearranged, the electronic device 100 may perform charging power detection. If detected charging power has a higher efficiency than a specified efficiency, the electronic device 100 may perform a charging operation. If the electronic device 100 receives a signal related to the charging operation from the external electronic device 1000*b*, the electronic device 100 may perform the noise preparation function to detect distribution of a noise magnetic field. If the distribution of the noise magnetic field corresponds to a non-alignment state (a state in which the electronic device is charged with a lower efficiency than a specified efficiency), the electronic device 100 may output the guide sound or the guide information as described above. According to an embodiment of the present disclosure, if an input from the electronic pen 300 occurs, the electronic device 100 may output the guide information on a portion where the input from the electronic pen 300 occurs. As the external electronic device 1000*b* and the electronic device 100 are rearranged, the electronic device 100 may collect input location information of the electronic pen 300 if the charging operation is performed. The electronic device 100 may perform charging current adjustment according to an input location of the electronic pen 300. For example, the electronic device 100 may request the external electronic device 1000*b* to decrease transmission power or adjust the area of a wireless power transmitting/receiving antenna disposed in the external electronic device 1000*b*. Alternatively, the electronic device 100 may adjust the area of the wireless power transmitting/receiving antenna of the electronic device 100. Alternatively, the electronic device 100 may request the external electronic device 1000*b* to change a frequency for transmitting power (e.g., a frequency that causes small interference or no interference in operation of the electronic pen 300).

According to various embodiments of the present disclosure, while transmitting wireless power, the external electronic device 1000*b* may control a current for transmitting the power in relation to operation of the electronic pen. For example, while transmitting wireless power, the external electronic device 1000*b* may determine whether an input event related to the operation of the electronic pen occurs. If the input event related to the operation of the electronic pen occurs, the external electronic device 1000*b* may decrease the current for transmitting the power to a specified value or lower (a value that does not cause an error in relation to the operation of the electronic pen). In this operation, the external electronic device 1000b may detect a noise magnetic field, and, if an electronic pen input event occurs on an area where the noise magnetic field has a certain intensity or higher (e.g., an edge area of a display of the external electronic device 1000b), the external electronic device 1000b may reduce the current for transmitting the power. If the electronic pen input event occurs on an area where the noise magnetic field has a specified intensity or lower, the external electronic device 1000b may maintain a previous power transmission state.

According to various embodiments of the present disclosure, an electronic device according to an embodiment of the present disclosure may include a processor and a memory operatively connected to the processor and configured to store at least one command, wherein the processor which executes the command may detect a noise level of each area of an input receiving panel in a wireless charging state and may output an alarm about a state of alignment between the electronic device and a wireless charging device according to distribution of the noise level on the input receiving panel.

According to various embodiments of the present disclosure, the electronic device may further include at least one of an audio device for outputting audio information on the state of alignment or a display for outputting guide information on the state of alignment.

According to various embodiments of the present disclosure, the electronic device may request the wireless charging device to suspend power transmission or transmit a charging current of which an intensity is lower than a specified value according to the distribution of the noise level.

According to various embodiments of the present disclosure, if the distribution of the noise level corresponds to a non-alignment state, the electronic device may output an alarm for notifying the non-alignment state, and may request the wireless charging device to suspend power transmission.

Figure 12:
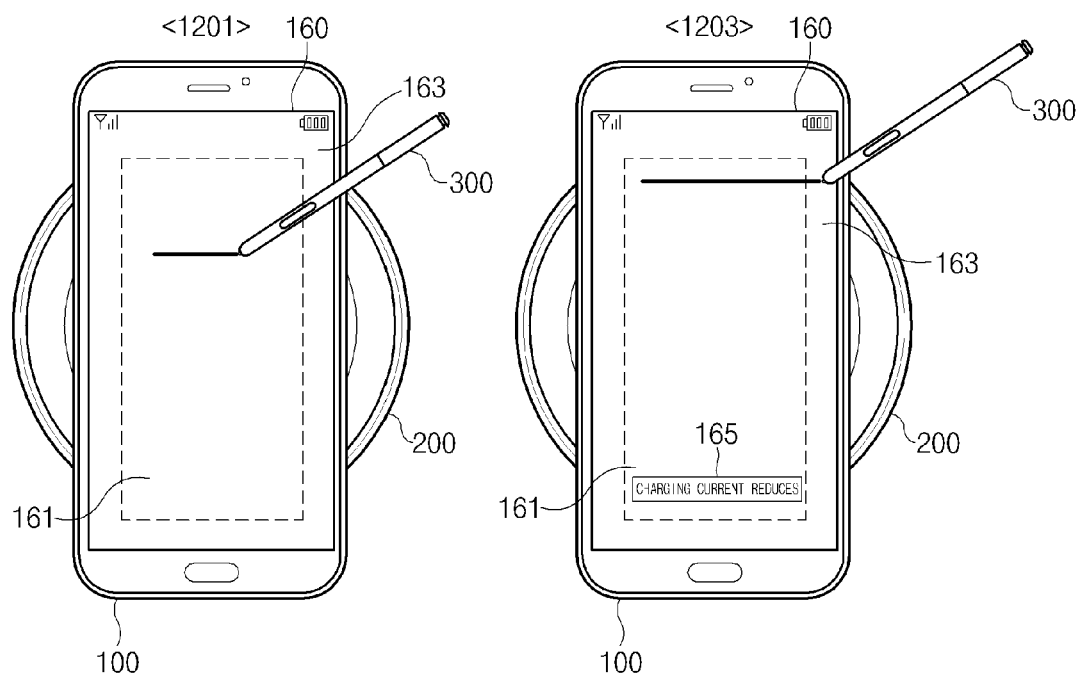
FIG. 12 is a diagram illustrating an example of a screen interface related to operation of an electronic pen according to an embodiment of the present disclosure.

FIG. 12 is a diagram illustrating an example of a screen interface related to operation of an electronic pen according to an embodiment of the present disclosure.

Referring to FIG. 12, the electronic device 100 may be placed on the wireless charging device 200 as illustrated in a state 1201. Here, a horizontal or vertical center line of the electronic device 100 may be substantially aligned with a horizontal or vertical center line of the wireless charging device 200. In this case, the electronic device 100 may detect a noise level caused by the wireless charging device 200. According to an embodiment of the present disclosure, the electronic device 100 may divide, on the basis of the detected noise level, the display 160 into a center area 161, where charging current adjustment is not required while the electronic pen 300 is operated, and an edge area 163, where charging current adjustment is required. According to various embodiments of the present disclosure, the electronic device 100 may divide the display 160 into more areas. For example, the edge area 163 may include a first edge area (e.g., left and right edge areas of the electronic device 100) where a charging current is required to be adjusted to a first charging current value and a second edge area (e.g., upper and lower edge areas of the electronic device 100) where the charging current is required to be adjusted to a second charging current value. The adjusted charging current values may be such values that an error does not occur when the electronic pen 300 is operated. In the case where the electronic pen 300 is operated on the center area 161, the electronic device 100 may perform an operation of drawing a line on an input portion as illustrated in FIG. 12. In this operation, the electronic pen 300 may not perform additional adjustment of the charging current.

According to various embodiments of the present disclosure, as illustrated in a state 1203, the electronic pen 300 may be moved from the center area 161 to the edge area 163. In this case, when entry to the edge area 163 occurs, the electronic device 100 may adjust the charging current. For example, the electronic device 100 may request the wireless charging device 200 to decrease transmission power to a specified value or lower. Alternatively, the electronic device 100 may perform at least one of requesting reduction of transmission power, requesting adjustment of the area of the transmitter coil, requesting adjustment of the area of the wireless power transmitting/receiving antenna, or requesting a change of the transmission power frequency.

Due to the above-mentioned charging current adjustment, the noise level caused by the wireless charging device 200 may be decreased. Therefore, even if an input from the electronic pen 300 occurs on the edge area 163, the electronic device 100 may perform an operation of drawing a line without an error.

According to various embodiments of the present disclosure, if the charging current is adjusted as an input from the electronic pen 300 occurs on the edge area 163, the electronic device 100 may output guide information 165 corresponding to the adjustment of the charging current. According to an embodiment of the present disclosure, the guide information 165 may be output to a specified portion of the display 160 (e.g., a lower end side of a screen). Alternatively, the guide information 165 may be output to a current input location of the electronic pen 300 (e.g., the edge area 163) or an adjacent area thereto. The guide information 165 may be temporarily output, or may be continually output while the input from the electronic pen 300 occurs on the edge area 163.

According to various embodiments of the present disclosure, the electronic device 100 may differently display the center area (where the charging current is not changed in relation to operation of the electronic pen 300) and the edge area (where the charging current is changed in relation to operation of the electronic pen 300). For example, the electronic device 100 may display the center area 161 and the edge area 163 in different colors. Alternatively, the electronic device 100 may visually display a dotted line for dividing the center area 161 from the edge area 163 as illustrated in FIG. 12. According to various embodiments of the present disclosure, the electronic device 100 may equally display the center area 161 and the edge area 163 without displaying the dotted line.

As described above, according to various embodiments of the present disclosure, a noise magnetic field applied by a wireless power transmitting device (e.g., an external electronic device or a wireless charging device) is reduced in a wireless charging state, so that a user may not experience inconvenience when using an electronic pen.

According to various embodiments of the present disclosure, an electronic device according to an embodiment of the present disclosure may include a housing, a display device (or a display) disposed in the housing, at least one sensor (e.g., a sensor module or at least one sensor for detecting a noise magnetic field generated on a wireless charging device) disposed in the housing and configured to detect a change of an external magnetic field, a wireless power circuit (e.g., a wireless charging module) disposed in the housing, a conductive pattern (e.g., a receiver coil or a receiver multi-coil) disposed in the housing and electrically connected to the wireless power circuit, a processor disposed in the housing and electrically connected to the display device, the sensor, and the wireless power circuit, and a memory electrically connected to the processor, wherein the memory may store instructions for instructing, when being executed, the processor to monitor a noise level of a noise signal received via the sensor while wireless power is transmitted and/or received at a first power level via at least the conductive pattern, and generate a signal for changing the first power level corresponding to at least a part of a change of at least one state detected via the sensor.

According to various embodiments of the present disclosure, a method for operating an electronic device according to an embodiment of the present disclosure may include monitoring a noise level of a noise signal received via a sensor while power is transmitted and/or received at a first power level via at least a conductive pattern, and generating a signal for changing the first power level corresponding to at least a part of a change of at least one state detected via the sensor.

As described above, according to an electronic device and a method for operating the same according to various embodiments of the present disclosure, a noise generated while wireless charging is performed may be detected, and it may be determined whether a detected noise level affects a specific function of the electronic device (e.g., at least one user function that may be affected by noise, such as an electronic pen operating function, a touch panel operating function, a recording function, or the like). For example, the electronic device 100 may include a lookup table about specific functions of the electronic device which may be affected by noise corresponding to noise levels. Therefore, in the case of performing a specific function at a specific noise level, the electronic device may perform at least one of the above-mentioned operations related to control of a charging current to thereby reduce the noise level. In relation to this operation, the electronic device may operate at least one sensor for detecting noise or may operate an input receiving panel as an element for detecting noise as described above.

Figure 13:
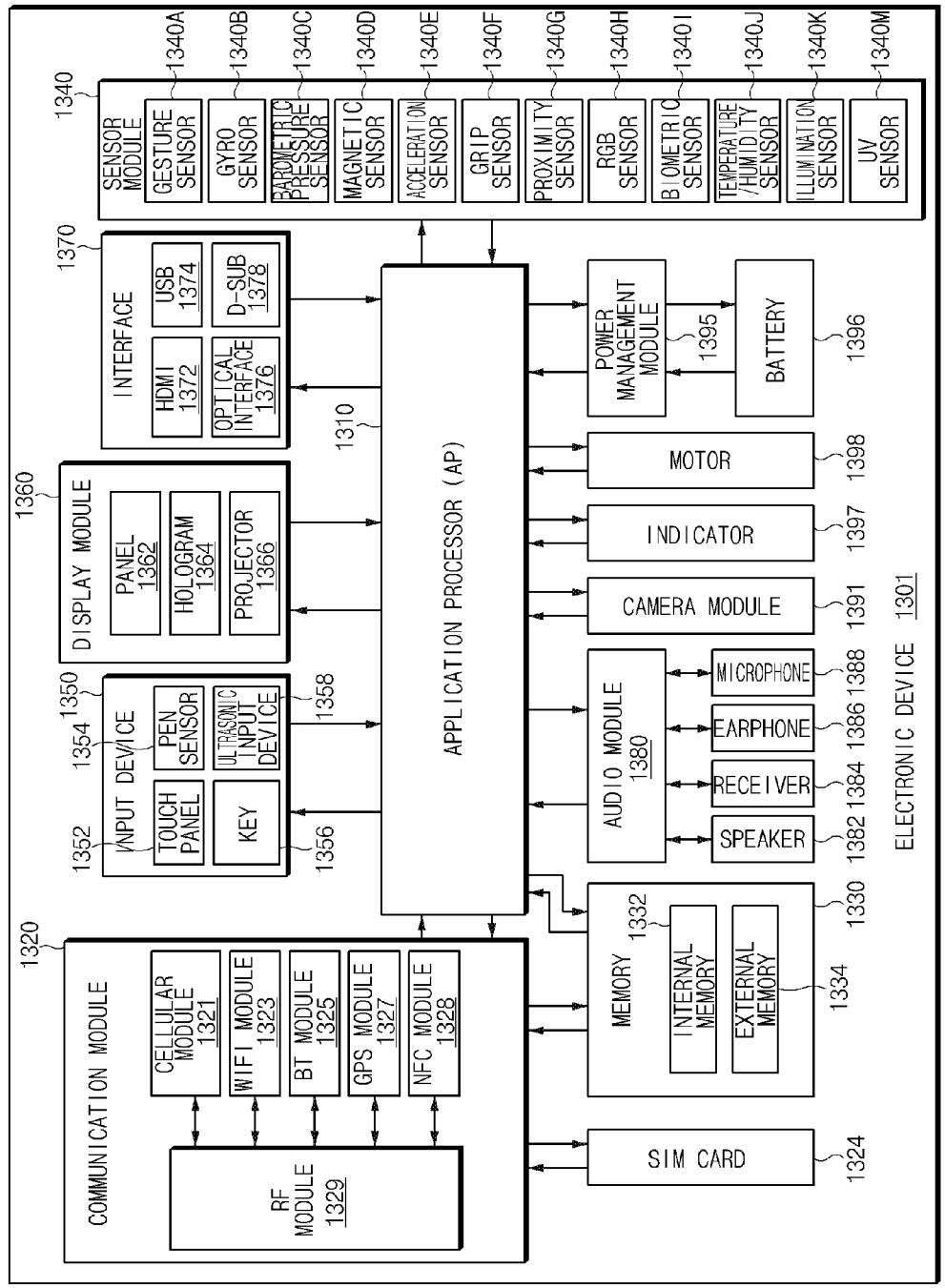
FIG. 13 is a block diagram illustrating an electronic device according to an embodiment of the present disclosure.

FIG. 13 is a block diagram illustrating an electronic device according to an embodiment of the present disclosure.

Referring to FIG. 13, an electronic device 1301 may include, for example, a part or the entirety of the electronic device described above with respect to the above-mentioned various embodiments of the present disclosure. The electronic device 1301 may include at least one processor (e.g., an application processor (AP)) 1310, a communication module 1320, a subscriber identity module 1324, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 (e.g., the main control module 120) may run an operating system or an application program so as to control a plurality of hardware or software elements connected to the processor 1310, and may perform various data processing and operations. The processor 1310 may be implemented with, for example, a system on chip (SoC). According to an embodiment of the present disclosure, the processor 1310 may further include a graphic processing unit (GPU) and/or an image signal processor. The processor 1310 may include at least a portion (e.g., the cellular module 1321) of the elements illustrated in FIG. 13. The processor 1310 may load, on a volatile memory, an instruction or data received from at least one of other elements (e.g., a non-volatile memory) to process the instruction or data, and may store various data in a nonvolatile memory.

The communication module 1320 may include, for example, a cellular module 1321, a Wi-Fi module 1323, a Bluetooth module 1325, a GNSS module 1327 (e.g., a GPS module, a GLONASS module, a BeiDou module, or a Galileo module), a near field communication (NFC) module 1328, and a radio frequency (RF) module 1329. In addition, the communication module 1320 may further include an MST module.

The cellular module 1321 may provide, for example, a voice call service, a video call service, a text message service, or an Internet service through a communication network. According to an embodiment of the present disclosure, the cellular module 1321 may identify and authenticate the electronic device 1301 in the communication network using the subscriber identity module 1324 (e.g., a SIM card). According to an embodiment of the present disclosure, the cellular module 1321 may perform at least a part of functions provided by the processor 1310. According to an embodiment, the cellular module 1321 may include a communication processor (CP).

Each of the Wi-Fi module 1323, the Bluetooth module 1325, the GNSS module 1327, and the NFC module 1328 may include, for example, a processor for processing data transmitted/received through the modules. According to various embodiments of the present disclosure, at least a portion (e.g., two or more) of the cellular module 1321, the Wi-Fi module 1323, the Bluetooth module 1325, the GNSS module 1327, and the NFC module 1328 may be included in a single integrated chip (IC) or IC package.

The RF module 1329 may transmit/receive, for example, communication signals (e.g., RF signals). The RF module 1329 may include, for example, a transceiver, a power amplifier module (PAM), a frequency filter, a low noise amplifier (LNA), an antenna, or the like. According to an embodiment of the present disclosure, at least one of the cellular module 1321, the Wi-Fi module 1323, the Bluetooth module 1325, the GNSS module 1327, or the NFC module 1328 may transmit/receive RF signals through a separate RF module.

The subscriber identity module 1324 may include, for example, an embedded SIM and/or a card containing a subscriber identity module, and may include unique identification information (e.g., an integrated circuit card identifier (ICCID)) or subscriber information (e.g., international mobile subscriber identity (IMSI)).

The memory 1330 (e.g., the memory 130) may include an internal memory 1332 or an external memory 1334. The internal memory 1332 may include at least one of a volatile memory (e.g., a dynamic RAM (DRAM), a static RAM (SRAM), a synchronous dynamic RAM (SDRAM), or the like) or a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like), a hard drive, or a solid state drive (SSD)).

The external memory 1334 may include a flash drive, for example, compact flash (CF), secure digital (SD), micro secure digital (Micro-SD), mini secure digital (Mini-SD), extreme digital (xD), multi-media card (MMC), a memory stick, or the like. The external memory 1334 may be operatively and/or physically connected to the electronic device 1301 through various interfaces.

The electronic device 1301 may further include a security module (not shown). The security module, which is a high-security module compared to the memory 1330, may be a circuit that guarantees secure storage of data and a protected execution environment. The security module may be implemented with a separate circuit, and may include a separate processor. The security module may include, for example, an embedded secure element (eSE) embedded in a fixed chip of the electronic device 1301 or present in a SD card or a detachable smart chip. The security module may be driven by an operating system (OS) different from an OS of the electronic device 1301. For example, the security module may be operated on the basis of Java Card Open Platform (JCOP).

The sensor module 1340 may, for example, measure physical quantity or detect an operation state of the electronic device 1301 so as to convert measured or detected information into an electrical signal. The sensor module 1340 may include, for example, at least one of a gesture sensor 1340A, a gyro sensor 1340B, a barometric pressure sensor 1340C, a magnetic sensor 1340D, an acceleration sensor 1340E, a grip sensor 1340F, a proximity sensor 1340G, a color sensor 1340H (e.g., a red/green/blue (RGB) sensor), a biometric sensor 1340I, a temperature/humidity sensor 1340J, an illumination sensor 1340K, or an ultraviolet (UV) sensor 1340M. Additionally or alternatively, the sensor module 1340 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1340 may further include a control circuit for controlling at least one sensor included therein. In various embodiments of the present disclosure, the electronic device 1301 may further include a processor configured to control the sensor module 1340 as a part of the processor 1310 or separately, so that the sensor module 1340 is controlled while the processor 1310 is in a sleep state.

The input device 1350 may include, for example, a touch panel 1352, a (digital) pen sensor 1354, a key 1356, or an ultrasonic input device 1358. The touch panel 1352 may employ at least one of capacitive, resistive, infrared, and ultraviolet sensing methods. The touch panel 1352 may further include a control circuit. The touch panel 1352 may further include a tactile layer so as to provide tactile reaction to a user.

The (digital) pen sensor 1354 may include, for example, a sheet for recognition which is a part of a touch panel or is separate. The key 1356 may include, for example, a physical button, an optical button, or a keypad. The ultrasonic input device 1358 may sense ultrasonic waves generated by an input tool through a microphone (e.g., a microphone 1388) so as to identify data corresponding to the ultrasonic waves sensed.

The display 1360 (e.g., the display 160) may include a panel 1362, a hologram device 1364, or a projector 1366. The panel 1362 may be, for example, flexible, transparent or wearable. The panel 1362 and the touch panel 1352 may be integrated into a single module. The hologram device 1364 may display a stereoscopic image in a space using a light interference phenomenon. The projector 1366 may project light onto a screen so as to display an image. The screen may be disposed in the inside or the outside of the electronic device 1301. According to an embodiment of the present disclosure, the display 1360 may further include a control circuit for controlling the panel 1362, the hologram device 1364, or the projector 1366.

The interface 1370 may include, for example, a high-definition multimedia interface (HDMI) 1372, a universal serial bus (USB) 1374, an optical interface 1376, or a D-subminiature (D-sub) 1378. Additionally or alternatively, the interface 1370 may include, for example, a mobile high-definition link (MHL) interface, a secure digital (SD) card/multi-media card (MMC) interface, or an infrared data association (IrDA) interface.

The audio module 1380 may convert, for example, a sound into an electrical signal or vice versa. The audio module 1380 may process sound information input or output through a speaker 1382, a receiver 1384, an earphone 1386, or the microphone 1388.

According to an embodiment of the present disclosure, the camera module 1391 for shooting a still image or a video may include, for example, at least one image sensor (e.g., a front sensor or a rear sensor), a lens, an image signal processor (ISP), or a flash (e.g., an LED or a xenon lamp).

The power management module 1395 may manage power of the electronic device 1301. According to an embodiment of the present disclosure, the power management module 1395 may include a power management integrated circuit (PMIC), a charger integrated circuit (IC), or a battery or fuel gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, or the like. The motor 1398 may convert an electrical signal into a mechanical vibration, and may generate a vibration or haptic effect. Although not illustrated, a processing device (e.g., a GPU) for supporting a mobile TV may be included in the electronic device 1301. The processing device for supporting a mobile TV may process media data according to the standards of digital multimedia broadcasting (DMB), digital video broadcasting (DVB), MediaFLO™, or the like.

Figure 14:
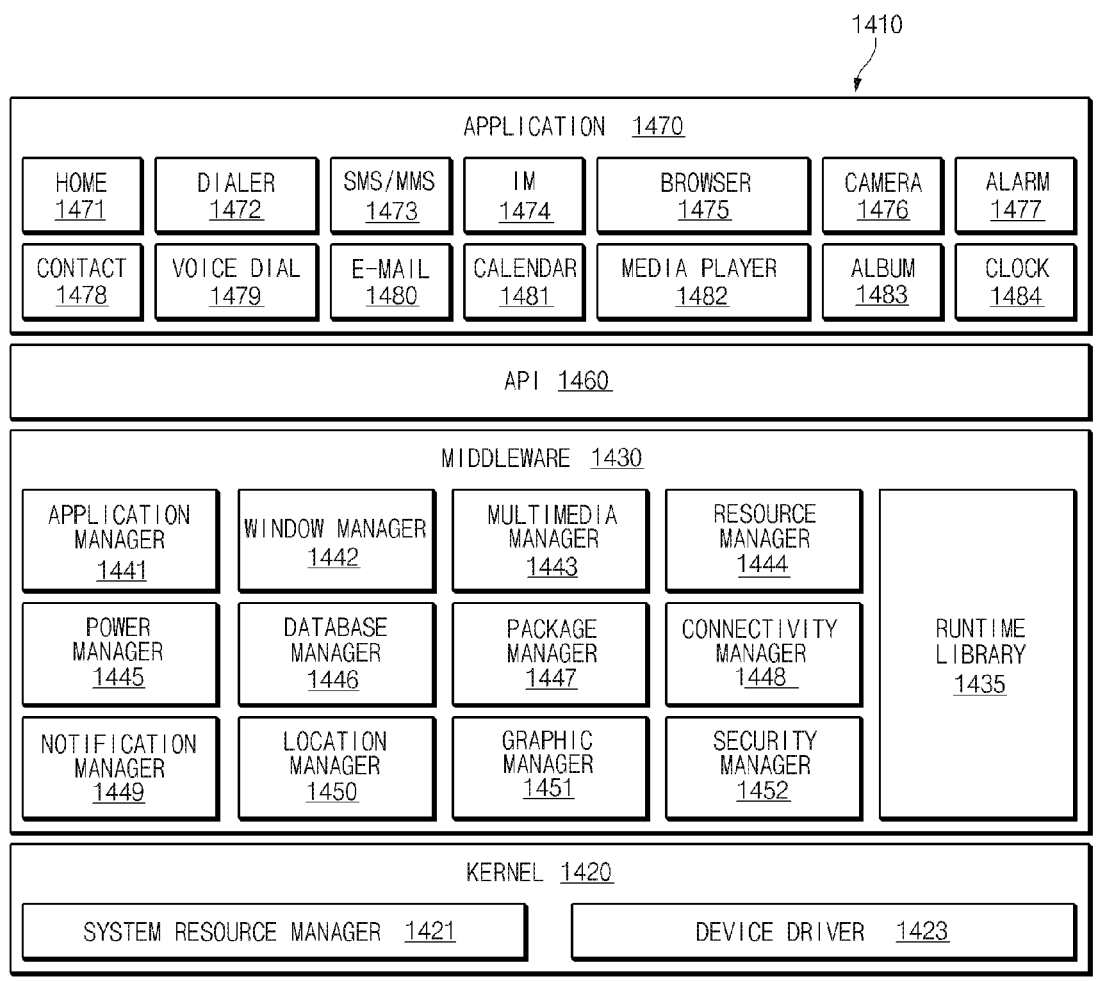
FIG. 14 is a diagram illustrating an example of a program module according to an embodiment of the present disclosure.

FIG. 14 is a diagram illustrating an example of a program module according to an embodiment of the present disclosure.

Referring to FIG. 14, a program module 1410 according to various embodiments of the present disclosure may include an OS for controlling a resource related to an electronic device (e.g., the electronic device 100) and/or various applications running on the OS. The operating system may be, for example, Android, iOS, Windows, Symbian, Tizen, Bada, or the like.

The program module 1410 may include a kernel 1420, a middleware 1430, an API 1460, and/or an application 1470. At least a part of the program module 1410 may be preloaded on the electronic device or may be downloaded from an external device.

The kernel 1420 may include, for example, a system resource manager 1421 and/or a device driver 1423. The system resource manager 1421 may perform control, allocation, or retrieval of a system resource. According to an embodiment of the present disclosure, the system resource manager 1421 may include a process management unit, a memory management unit, a file system management unit, or the like. The device driver 1423 may include, for example, a display driver, a camera driver, a Bluetooth driver, a shared memory driver, a USB driver, a keypad driver, a Wi-Fi driver, an audio driver, or an inter-process communication (IPC) driver.

The middleware 1430, for example, may provide a function that the applications 1470 require in common, or may provide various functions to the applications 1470 through the API 1460 in order to allow the applications 1470 to efficiently use limited system resources in the electronic device. According to an embodiment of the present disclosure, the middleware 1430 may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, or a security manager 1452.

The runtime library 1435 may include, for example, a library module that a complier uses to add a new function through a programming language while the application 1470 is running. The runtime library 1435 may perform a function for input/output management, memory management, or an arithmetic function.

The application manager 1441 may mange, for example, a life cycle of at least one of the applications 1470. The window manager 1442 may manage a GUI resource used in a screen. The multimedia manager 1443 may recognize a format required for playing various media files and may encode or decode a media file using a codec matched to the format. The resource manager 1444 may manage a resource such as a source code, a memory, or a storage space of at least one of the applications 1470.

The power manager 1445, for example, may operate together with a basic input/output system (BIOS) to manage a battery or power and may provide power information required for operating the electronic device. The database manager 1446 may generate, search, or modify a database to be used in at least one of the applications 1470. The package manager 1447 may manage installation or update of an application distributed in a package file format.

The connectivity manger 1448 may manage wireless connection of Wi-Fi, Bluetooth, or the like. The notification manager 1449 may display or notify an event such as message arrival, appointments, and proximity alerts in such a manner as not to disturb a user. The location manager 1450 may manage location information of the electronic device. The graphic manager 1451 may manage a graphic effect to be provided to a user or a user interface related thereto. The security manager 1452 may provide various security functions required for system security or user authentication. According to an embodiment of the present disclosure, in the case where an electronic device (e.g., the electronic device 100) includes a phone function, the middleware 1430 may further include a telephony manager for managing a voice or video call function of the electronic device.

The middleware 1430 may include a middleware module for forming a combination of various functions of the above-mentioned elements. The middleware 1430 may provide a module specialized for each type of an operating system to provide differentiated functions. Furthermore, the middleware 1430 may delete a part of existing elements or may add new elements dynamically.

The API 1460 which is, for example, a set of API programming functions may be provided in different configurations according to an operating system. For example, in the case of Android or iOS, one API set may be provided for each platform, and, in the case of Tizen, at least two API sets may be provided for each platform.

The application 1470, for example, may include at least one application for providing functions such as a home 1471, a dialer 1472, an SMS/MMS 1473, an instant message (IM) 1474, a browser 1475, a camera 1476, an alarm 1477, a contact 1478, a voice dial 1479, an e-mail 1480, a calendar 1481, a media player 1482, an album 1483, a clock 1484, payment, health care (e.g., measure an exercise amount or blood sugar), or environmental information provision (e.g., provide air pressure, humidity, or temperature information).

According to an embodiment of the present disclosure, the application 1470 may include an application (hereinafter referred to as an "information exchange application") for supporting information exchange between the electronic device (e.g., the electronic device 100) and a server. The information exchange application may include, for example, a notification relay application for relaying specific information to an external device or a device management application for managing an external electronic device or an external device.

For example, the notification relay application may have a function for relaying, to an external electronic device, notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external device itself (or some elements) or the brightness (or resolution) adjustment of a display) of the external electronic device communicating with the electronic device, an application running in the external electronic device, or a service (e.g., a call service or a message service) provided from the external electronic device.

According to an embodiment of the present disclosure, the application 1470 may include a specified application (e.g., a healthcare application of a mobile medical device) according to an attribute of the external electronic device. According to an embodiment of the present disclosure, the application 1470 may include an application received from the external electronic device or a server. According to an embodiment of the present disclosure, the application 1470 may include a preloaded application or a third-party application downloadable from a server. The names of the elements of the program module 1410 illustrated may vary with the type of an operating system.

According to various embodiments of the present disclosure, at least a part of the program module 1410 may be implemented with software, firmware, hardware, or a combination thereof. At least a part of the program module 1410, for example, may be implemented (e.g., executed) by a processor (e.g., the main control module 120). At least a part of the program module 1410 may include, for example, a module, a program, a routine, sets of instructions, or a process for performing at least one function.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the main control module 120), the processor may perform functions corresponding to the instructions. The computer-readable storage medium may be, for example, the memory 130.

A computer-readable recording medium may include a hard disk, a floppy disk, a magnetic medium (e.g., a magnetic tape), an optical medium (e.g., CD-ROM, DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one software module for performing operations of various embodiments of the present disclosure and vice versa.

The module or program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, an electronic device may accurately operate an electronic pen even in a wireless charging state.

Furthermore, the electronic device according to various embodiments of the present disclosure may control a wireless charging state according to operation conditions of the electronic pen, so that the electronic pen may be operated accurately while the efficiency of wireless charging is optimized.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a panel configured to detect a change of an external magnetic field;
a wireless power circuit;
a conductive pattern electrically connected to the wireless power circuit;
a processor electrically connected to the panel and to the wireless power circuit; and
a memory electrically connected to the processor,
wherein the memory stores instructions for instructing, when being executed, the processor to:
monitor a noise level of a noise signal, which is generated by an input that is received via the panel, while wireless power is transmitted and/or received at a first power level through the conductive pattern, and
generate a signal for changing the first power level to a second power level, which is less than the first power level, based on a location of the input on the panel to reduce interference from the wireless power being transferred at the location of the input.

2. The electronic device of claim 1, wherein the memory stores instructions for instructing, when being executed, the processor to maintain an intensity of a wireless charging current so that wireless charging of the first power level is performed if the noise level is lower than a specified value.

3. The electronic device of claim 1, wherein the memory stores instructions for instructing, when being executed, the processor to lower an intensity of a wireless charging current so that wireless charging of the second power level, which is less than the first power level, is performed if the noise level is higher than a specified value.

4. The electronic device of claim 3, further comprising:
a plurality of wireless power antennas configured to receive the wireless power; and
a switch configured to select at least one of the plurality of wireless power antennas,
wherein the memory stores instructions for instructing, when being executed, the processor to select at least a portion of the plurality of wireless power antennas by controlling the switch to reduce an antenna size for transmitting/receiving the wireless power.

5. The electronic device of claim 1, wherein the memory stores instructions for instructing, when being executed, the processor to perform a wireless charging of a specified power level corresponding to the noise level.

6. The electronic device of claim 1, wherein the memory stores instructions for instructing, when being executed, the processor to transmit a signal for requesting adjustment of a wireless charging current to a wireless charging device.

7. The electronic device of claim 6, wherein the memory stores instructions for instructing, when being executed, the processor to transmit, to the wireless charging device, at least one of a signal for requesting reduction of transmission power, a signal for requesting reduction of a size of a transmitter coil, or a signal for requesting a change of a transmission frequency.

8. The electronic device of claim 1, wherein the memory stores instructions for instructing, when being executed, the processor to output guide information for changing a charging current if an input occurs on a panel area from which a noise of a specified noise level or higher is measured.

9. The electronic device of claim 8, wherein the memory stores instructions for instructing, when being executed, the processor to display the guide information on a location of the input or an adjacent area thereto.

10. The electronic device of claim 1, wherein the memory stores instructions for instructing, when being executed, the processor to output an alarm about a state of arrangement of the electronic device and a wireless charging device on a basis of a distribution state of the noise level.

11. A method for operating an electronic device, the method comprising:
monitoring, by the electronic device, a noise level of a noise signal, which is generated by an input that is received via a panel, while wireless power is transmitted and/or received at a first power level through a conductive pattern; and
generating, by the electronic device, a signal for changing the first power level to a second power level, which is less than the first power level, based on a location of the input from on the panel to reduce interference from the wireless power being transferred at the location of the input.

12. The method of claim 11, wherein the generating comprises maintaining a wireless charging state of the first power level if the noise level is lower than a specified value.

13. The method of claim 11, wherein the generating comprises reducing an intensity of a wireless charging current so that wireless charging corresponding to the second power level different from the first power level is performed if the noise level is higher than a specified value.

14. The method of claim 13, wherein the reducing comprises reducing a size of a wireless power antenna.

15. The method of claim 11, wherein the generating comprises collecting a wireless charging current of a specified intensity according to the noise level.

16. The method of claim 11, wherein the generating comprises transmitting, to a wireless charging device, a signal for requesting adjustment of a wireless charging current.

17. The method of claim 16, wherein the transmitting of the signal to the wireless charging device comprises transmitting, to the wireless charging device, at least one of a signal for requesting reduction of transmission power, a signal for requesting reduction of an area of a transmitter coil, or a signal for requesting a change of a transmission frequency.

18. The method of claim 11, further comprising:
outputting guide information for changing a charging current if an input occurs on a panel area from which a noise of a specified noise level or higher is measured.

19. The method of claim 18, wherein the outputting comprises displaying the guide information on a location of the input or an adjacent area thereto.

20. The method of claim 11, further comprising:
outputting an alarm about a state of arrangement of the electronic device and a wireless charging device according to a distribution state of the noise level.

* * * * *